(12) United States Patent
Saito et al.

(10) Patent No.: US 9,989,363 B2
(45) Date of Patent: Jun. 5, 2018

(54) HEMISPHERICAL RESONATOR GYRO

(71) Applicant: MITSUBISHI ELECTRIC CORPORATION, Chiyoda-ku (JP)

(72) Inventors: Mitsunori Saito, Chiyoda-ku (JP); Yurika Kanai, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 98 days.

(21) Appl. No.: 15/109,344

(22) PCT Filed: May 29, 2014

(86) PCT No.: PCT/JP2014/064260
§ 371 (c)(1),
(2) Date: Jun. 30, 2016

(87) PCT Pub. No.: WO2015/107704
PCT Pub. Date: Jul. 23, 2015

(65) Prior Publication Data
US 2016/0334214 A1 Nov. 17, 2016

(30) Foreign Application Priority Data
Jan. 14, 2014 (JP) .................................. 2014-004086

(51) Int. Cl.
*G01C 19/5691* (2012.01)
*G01C 19/56* (2012.01)

(52) U.S. Cl.
CPC ................................ *G01C 19/5691* (2013.01)

(58) Field of Classification Search
CPC ............................ G01C 19/5691; G01C 19/56
See application file for complete search history.

(56) References Cited

U.S. PATENT DOCUMENTS 4,157,041 A    6/1979  Loper, Jr. et al.
4,951,508 A *  8/1990  Loper, Jr. ........... G01C 19/5691
                                                    73/1.84
(Continued)

FOREIGN PATENT DOCUMENTS

EP    2 177 875 A2    4/2010
EP    2 177 875 A3    4/2010
(Continued)

OTHER PUBLICATIONS

International Search Report dated Jul. 1, 2014 in PCT/JP14/064260 Filed May 29, 2014.
(Continued)

*Primary Examiner* — Helen Kwok
(74) *Attorney, Agent, or Firm* — Oblon, McClelland, Maier & Neustadt, L.L.P.

(57) ABSTRACT

A hemispherical resonator gyro includes: a vibration mode shape extractor to extract, based on sine and cosine wave signals corresponding to an actuator drive frequency and radial displacement of a hemispherical resonator, a vibration mode shape excited in the hemispherical resonator; a drive frequency corrector to cause, based on a resonance phase characteristic of the hemispherical resonator, the actuator drive frequency to match resonance frequency of the hemispherical resonator; a nodal quadrature vibration controller to generate, based on a vibration amplitude of a nodal quadrature vibration and azimuth orientation of wave antinode of a resonance mode, an actuator DC drive signal to suppress the nodal quadrature vibration; and a resonance controller to generate an actuator AC drive signal to control the vibration amplitude to be a constant value, and detect a rotational angle in an angle measurement axis direction from the azimuth orientation of wave antinode of the resonance mode.

20 Claims, 9 Drawing Sheets

(56) References Cited

U.S. PATENT DOCUMENTS

| | | | |
|---|---|---|---|
| 5,383,362 A | | 1/1995 | Putty et al. |
| 5,712,427 A | * | 1/1998 | Matthews .......... G01C 19/5691 73/1.37 |
| 8,806,939 B2 | * | 8/2014 | Painter ............... G01C 19/5691 73/504.13 |
| 2007/0240508 A1 | | 10/2007 | Watson |
| 2007/0256495 A1 | | 11/2007 | Watson |
| 2010/0089158 A1 | | 4/2010 | Watson |
| 2016/0334214 A1 | * | 11/2016 | Saito .................. G01C 19/5691 |

FOREIGN PATENT DOCUMENTS

| | | |
|---|---|---|
| JP | 54-153970 A | 12/1979 |
| JP | 60-166818 A | 8/1985 |
| JP | 6-241810 A | 9/1994 |
| JP | 10-260056 A | 9/1998 |
| JP | 2010-96765 A | 4/2010 |
| JP | 2011-252927 A | 12/2011 |

OTHER PUBLICATIONS

Extended European Search Report dated Aug. 7, 2017 in European Patent Application No. 14878525.6.

* cited by examiner (a) POSITIVE DIRECTION ROTATIONAL COORDINATE SYSTEM (b) NEGATIVE DIRECTION ROTATIONAL COORDINATE SYSTEM

HEMISPHERICAL RESONATOR GYRO

TECHNICAL FIELD

The present invention relates to a hemispherical resonator gyro (HRG), and more particularly, to a hemispherical resonator gyro configured to generate a first-order resonance on a resonator in a hemispherical shape, and detect a rotational angle from a phase change of the resonance mode, or detect a rotational angular velocity from a control amount for suppressing a phase change of the resonance mode.

BACKGROUND ART

As a related-art hemispherical resonator gyro, for example, there is known a vibratory rotation sensor disclosed in Patent Literature 1. A principal mechanical system configuration of this vibratory rotation sensor includes a hemispherical resonator, forcers, and pick-offs. The forcers are used to excite a first-order resonance mode on the hemispherical resonator, and the pick-offs are used to detect a phase change of the resonance mode, to thereby detect a rotational angle in a sensor measurement axis direction.

On the other hand, an electric system and a control system of this vibratory rotation sensor are constructed by four functions including (1) a reference phase generator, (2) first-order resonance amplitude control, (3) quadrature vibration control, and (4) phase angle detection of the first-order resonance mode. A description is now given of the functions (1) to (4).

First, through use of a phase locked loop (PLL) implemented in the reference phase generator, the first-order resonance frequency of the hemispherical resonator is locked based on detection signals output from the pick-offs, and further, various reference phase signals are generated. The detection signal output from the pick-off is demodulated based on the reference phase signal generated by the reference phase generator, and is translated to amplitude of the first-order resonance mode and a nodal quadrature vibration excited in the hemispherical resonator.

In the first-order resonance amplitude control, based on the reference phase signal generated by the reference phase generator, a square wave voltage applied to the forcer is controlled so that the amplitude of the first-order resonance mode excited in the hemispherical resonator is a constant value set in advance.

In the quadrature vibration control, through control of a DC voltage applied to the forcer so as to add a negative spring stiffness to an orthogonal axis displaced by 22.5 degrees with respect to a wave antinode phase angle of the first-order resonance mode, the amplitude of the nodal quadrature vibration is suppressed to zero so as to realize a state in which only the first-order resonance mode is excited in the hemispherical resonator.

Finally, in the phase angle detection of the first-order resonance mode, a wave antinode phase angle of the first-order resonance mode excited in the hemispherical resonator is calculated, and the rotational angle in the sensor measurement axis direction is detected by multiplying a change amount of the phase angle by a scale factor unique to the hemispherical resonator.

As another example of the related-art hemispherical resonator gyro, for example, there is known a control circuit for a vibratory gyroscope disclosed in Patent Literature 2.

In this control circuit for vibratory gyroscope, the first-order resonance mode excited in the resonator is considered as a composition of two traveling waves traveling clockwise and counterclockwise on the resonator in a circumferential direction thereof, and based on detection signals output from pick-offs, a reference phase signal is generated for each of the traveling waves by a phase locked loop (PLL).

Further, in order to correct a damping of a resonator vibration so as to maintain a vibration amplitude of each of the traveling waves to be a constant value set in advance, and to efficiently excite the first-order resonance mode on the resonator, based on the reference phase signal, a forcer application voltage is controlled under a state in which the phase is advanced by 90 degrees with respect to a radial displacement of each of the traveling waves.

Finally, from a phase difference of the reference phase signal relating to each of the traveling waves generated by the phase locked loop (PLL), the wave antinode phase angle of the first-order resonance mode excited in the resonator is calculated, and a change amount of the phase angle is multiplied by a scale factor unique to the resonator, to thereby detect the rotational angle in the sensor measurement axis direction.

CITATION LIST

Patent Literature

[PTL 1] JP 60-166818 A
[PTL 2] JP H06-241810 A

SUMMARY OF INVENTION

Technical Problem

In this kind of hemispherical resonator gyro, the phase locked loop (PLL) is applied to the lock of the first-order resonance frequency in the hemispherical resonator and the generation of the various reference phase signals with respect to the first-order resonance frequency.

However, the phase locked loop (PLL) has a problem in that stability of the PLL itself may be spoiled depending on an internal loop filter design.

Moreover, as an ideal PLL output, high spectral purity for simultaneously realizing a low phase noise characteristic and a spurious suppression characteristic is required, but those characteristics are in a trade-off relationship, and thus there is also such a problem that it is difficult to acquire the PLL output having high spectral purity.

In addition, in order to increase a detection resolution of the hemispherical resonator gyro, it is indispensable to improve a phase resolution of the reference phase signal. However, for example, for a signal having a first-order resonance frequency of 4 kHz, an equivalent temporal resolution to realize a phase resolution of 0.1 degree is 70 ns. Therefore, there is also such a problem that the phase resolution of the reference phase signal in the PLL, namely, a detection resolution of the hemispherical resonator gyro is limited.

Further, in the related-art hemispherical resonator gyro, assuming that a phase characteristic of a forced vibration displacement with respect to an exciting force is −90 degrees in an ideal resonance system, the phase of a forcer drive voltage command is advanced by 90 degrees with respect to the radial displacement of the resonator in order to efficiently excite the first-order resonance mode on the resonator.

However, in addition to the phase characteristic of −90 degrees from the exciting force to the forced vibration displacement in an ideal resonance system, a phase characteristic from the forcer drive voltage command to a true exciting force generated on the forcer and a phase characteristic from a true resonator displacement to the pick-off detection signal are also superimposed on a phase characteristic from the forcer drive voltage command to the resonator displacement, and thus there is also such a problem that the latter ones need to be considered for efficient excitation of the first-order resonance mode for the resonator.

The present invention has been made to solve the above-mentioned problems, and therefore has an object to provide a hemispherical resonator gyro having improved its angle or angular velocity detection resolution by performing the angle detection or the angular velocity detection without using the related-art phase locked loop (PLL) to always operate stably and realize an operation extremely high in the spectral purity of the hemispherical resonator with respect to the first-order resonance frequency lock and a high phase resolution with respect to the primary resonance frequency.

Solution to Problem

According to one embodiment of the present invention, there is provided a hemispherical resonator gyro, including: a hemispherical resonator in an axisymmetric hemispherical shape about an angle measurement axis serving as a measurement axis, configured to maintain an resonance pattern in a plane perpendicular to the angle measurement axis; an upper housing and a lower housing configured to support the hemispherical resonator via the angle measurement axis; a plurality of actuators arranged on the upper housing at an equal interval about the angle measurement axis, each configured to generate an attraction force in a radial direction acting on the hemispherical resonator; a plurality of displacement sensors arranged on the lower housing at an equal interval about the angle measurement axis, each configured to detect a displacement in a radial direction of the hemispherical resonator; reference signal generation means configured to generate a sine wave signal and a cosine wave signal corresponding to a drive frequency of the actuator; vibration mode shape extraction means configured to extract, based on the sine wave signal and the cosine wave signal output from the reference signal generation means, and the displacement in the radial direction of the hemispherical resonator output from each of the plurality of displacement sensors, a vibration amplitude and an azimuth orientation of wave antinode of a resonance mode excited in the hemispherical resonator, a resonance phase characteristic with respect to an AC drive signal for the actuator, and a vibration amplitude of a nodal quadrature vibration excited in the hemispherical resonator; drive frequency correction means configured to cause, based on the resonance phase characteristic with respect to the AC drive signal for the actuator output from the vibration mode shape extraction means, the drive frequency of the actuator to match a resonance frequency of the hemispherical resonator; nodal quadrature vibration control means configured to generate, based on the vibration amplitude of the nodal quadrature vibration and the azimuth orientation of wave antinode of the resonance mode output from the vibration mode shape extraction means, a DC drive signal for the each of the plurality of actuators to suppress the nodal quadrature vibration; and resonance control means configured to generate, based on the vibration amplitude and the azimuth orientation of wave antinode of the resonance mode output from the vibration mode shape extraction means and the cosine wave signal output from the reference signal generation means, the AC drive signal for the each of the plurality of actuators to control the vibration amplitude of the resonance mode excited in the hemispherical resonator to be a constant value set in advance, and to realize a free rotation of the resonance mode about the angle measurement axis, in which a rotational angle in the angle measurement axis direction of the hemispherical resonator gyro is detected from the azimuth orientation of wave antinode of the resonance mode excited in the hemispherical resonator.

Advantageous Effects of Invention

According to the present invention, the detailed vibration mode shapes of the first-order resonance mode and the nodal quadrature vibration excited in the hemispherical resonator can be extracted without using the related-art phase locked loop (PLL), and thus the operation of the hemispherical resonator gyro can always be stabilized, the operation extremely high in the spectral purity and the highly precise lock with respect to the first-order resonance frequency of the hemispherical resonator can be enabled, and further, the high phase resolution for the first-order resonance frequency is realized, to thereby improve the angle detection resolution.

DESCRIPTION OF EMBODIMENTS

First Embodiment

Figure 1:
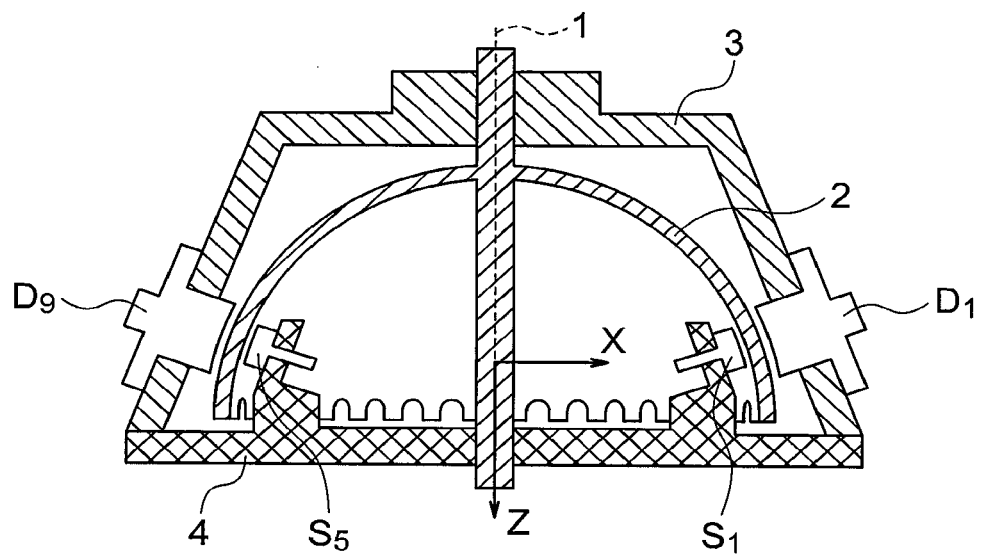
FIG. 1 is a schematic cross sectional view for illustrating a hemispherical resonator gyro taken along a plane including an angle or angular velocity measurement axis according to first to fourth embodiments of the present invention.
Figure 2:
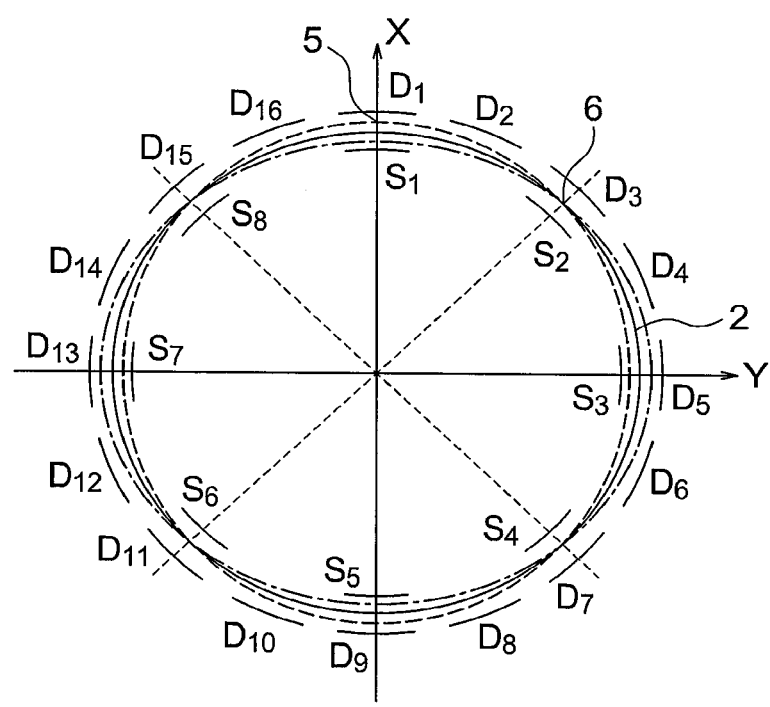
FIG. 2 is a schematic diagram for illustrating a spatial arrangement of a hemispherical resonator, actuators, and displacement sensors of the hemispherical resonator gyro taken along a plane perpendicular to the angle or angular velocity measurement axis according to the first to fourth embodiments of the present invention.

In FIG. 1 and FIG. 2, a mechanical system configuration of a hemispherical resonator gyro according to a first embodiment of the present invention is illustrated.

FIG. 1 is a cross sectional view taken along a plane including an angle measurement axis for illustrating the mechanical system configuration of the hemispherical resonator gyro according to the first embodiment of the present invention. FIG. 2 is a schematic diagram for illustrating a spatial arrangement of a hemispherical resonator, actuators, and displacement sensors taken along a plane perpendicular to the angle measurement axis for illustrating the mechanical system configuration of the hemispherical resonator gyro according to the present invention.

As illustrated in FIG. 1, the mechanical system of the hemispherical resonator gyro according to the first embodiment includes a hemispherical resonator 2 having a hemispherical shape axisymmetric with respect to an angle measurement axis 1 (Z axis). The hemispherical resonator 2 can maintain a resonance pattern on a plane (XY plane) perpendicular to the angle measurement axis 1. Note that, as illustrated in FIG. 1, the X axis is an axis perpendicular to the Z axis, and in FIG. 1, the Y axis is not shown, but as illustrated in FIG. 2, the Y axis is an axis perpendicular to the X axis and the Z axis. The hemispherical resonator 2 is supported by an upper housing 3 and a lower housing 4 via the angle measurement axis 1. The upper housing 3 is in a rectangular box shape opening at a bottom, and is trapezoidal in a cross sectional shape. Moreover, the lower housing 4 is a plate member, and has such a size as to close the opening of the upper housing 3. The hemispherical resonator 2 is stored in a housing constructed by the upper housing 3 and the lower housing 4. On the upper housing 3, a plurality of actuators $D_j$ (j=1, 2, . . . ) each configured to generate a radial attraction force to be applied to the hemispherical resonator 2 are arranged at an equal interval about the angle measurement axis 1. Further, on the lower housing 4, a plurality of displacement sensors $S_k$ (k=1, 2, . . . ) each configured to detect a radial displacement of the hemispherical resonator 2 are arranged at an equal interval about the angle measurement axis 1.

The most general configuration of the hemispherical resonator gyro according to the present invention is, as illustrated in FIG. 2, the one in which a total of 16 actuators $D_j$ (j=1, 2, . . . , 16) are arranged at an interval of 22.5 degrees about the angle measurement axis 1. In this configuration, through control of the radial attraction force generated by each of the actuators $D_j$ (j=1, 2, . . . , 16), a first-order resonance mode is generated on the hemispherical resonator 2. This first-order resonance mode is an elliptical shape on the plane (XY plane) perpendicular to the angle measurement axis 1. For example, when the first-order resonance mode is excited with respect to the X-Y orthogonal axes, in FIG. 2, such a vibration mode is formed that an elliptical shape having the major axis in the X axis direction represented in a broken line, and also in FIG. 2, an elliptical shape having the major axis in the Y axis direction represented by a long dashed short dashed line are alternately repeated at a ½ cycle. On this occasion, a point represented, for example, by a point 5 on the hemispherical resonator 2 at which the vibration amplitude is maximum is referred to as a wave antinode, and a point represented, for example, by a point 6 on the hemispherical resonator 2 at which the vibration amplitude is not generated is referred to as a wave node. Further, as the most general configuration of the hemispherical resonator gyro according to this embodiment, as illustrated in FIG. 2, a total of 8 displacement sensors $S_k$ (k=1, 2, . . . , 8) are arranged at an interval of 45 degrees about the angle measurement axis 1, thereby detecting radial displacements caused by the vibration excited in the hemispherical resonator 2.

Next, the hemispherical resonator gyro according to the first embodiment of the present invention is illustrated in FIG. 3 to FIG. 12.

Figure 3:
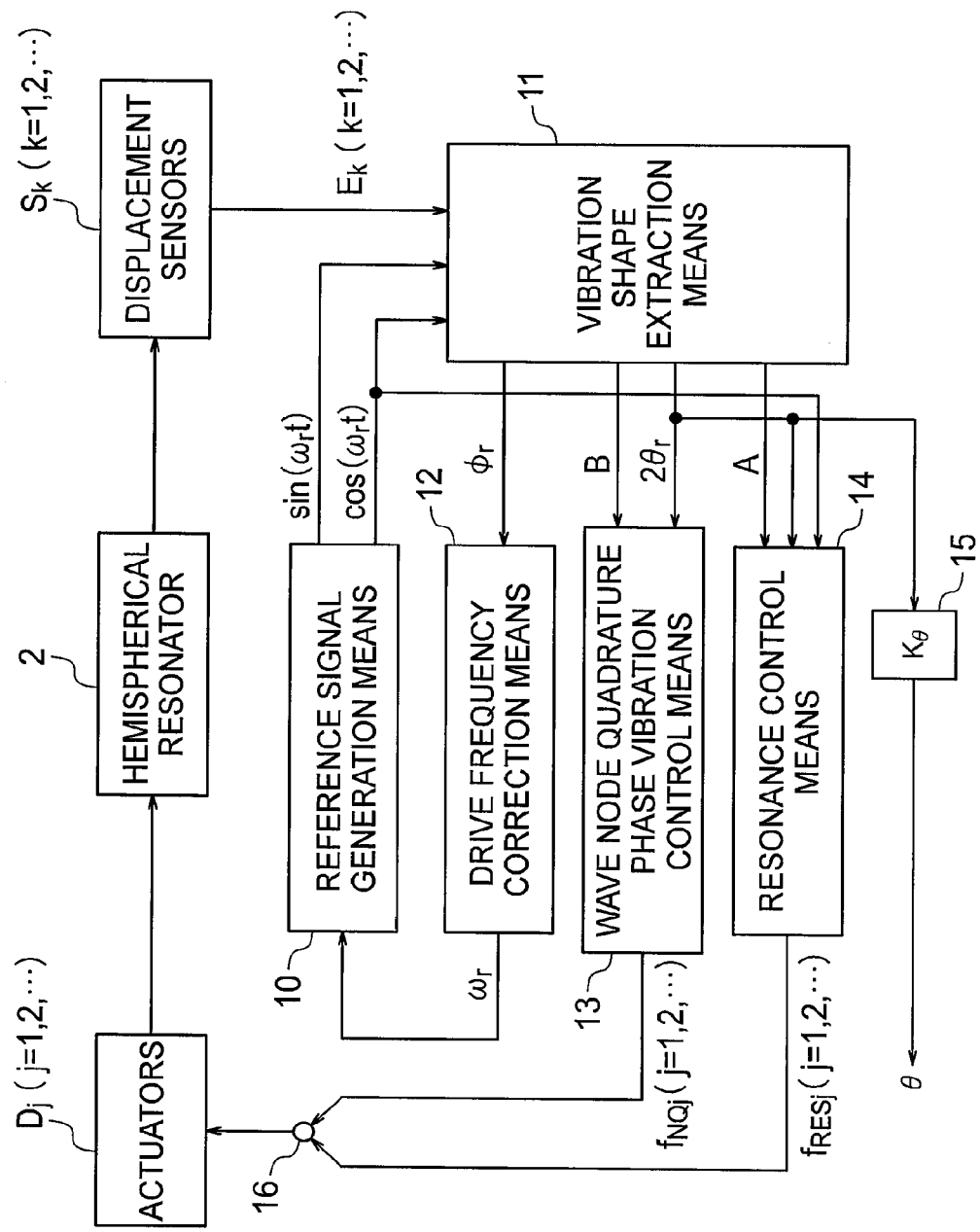
FIG. 3 is a block diagram for illustrating an entire configuration of the hemispherical resonator gyro according to the first and second embodiments of the present invention.

FIG. 3 is a block diagram for illustrating an overall configuration of the hemispherical resonator gyro according to the first embodiment of the present invention. As illustrated in FIG. 3, the hemispherical resonator gyro according to the first embodiment includes the hemispherical resonator 2, the actuators $D_j$ (j=1, 2, . . . , 16), the displacement sensors $S_k$ (k=1, 2, . . . , 8), reference signal generation means 10, vibration mode shape extraction means 11, drive frequency correction means 12, nodal quadrature vibration control means 13, resonance control means 14, angular scale factor multiplication means 15, and actuator drive signal composition means 16.

In the configuration illustrated in FIG. 3, the reference signal generation means 10 is configured to generate a sine wave signal $\sin(\omega_r t)$ and a cosine wave signal $\cos(\omega_r t)$ corresponding to an actuator drive frequency $\omega_r$.

In the vibration mode shape extraction means 11, based on the sine wave signal $\sin(\omega_r t)$ and the cosine wave signal $\cos(\omega_r t)$ output from the reference signal generation means 10, and displacement sensor outputs $E_k$ (k=1, 2, . . . , 8) output from the plurality of displacement sensors $S_k$ (k=1, 2, . . . , 8), a vibration amplitude A of the first-order resonance mode excited in the hemispherical resonator 2, an azimuth orientation $\theta_r$ of wave antinode, a resonance phase characteristic $\varphi_r$ corresponding to the actuator AC drive signals $f_{RESj}$ (j=1, 2, . . . , 16), and a vibration amplitude B of the nodal quadrature vibration excited in the hemispherical resonator are extracted.

In the drive frequency correction means 12, based on the resonance phase characteristic $\varphi_r$ corresponding to the actuator AC drive signals $f_{RESj}$ (j=1, 2, . . . , 16) output from the vibration mode shape extraction means 11, the actuator drive frequency $\omega_r$ is caused to match the resonance frequency of the hemispherical resonator 2.

In the nodal quadrature vibration control means 13, based on the vibration amplitude B of the nodal quadrature vibration and the azimuth orientation $\theta_r$ of wave antinode of the first-order resonance mode output from the vibration mode shape extraction means 11, a plurality of actuator DC drive signals $f_{NQj}$ (j=1, 2, . . . , 16) for suppressing the nodal quadrature vibration are generated.

In the resonance control means 14, based on the vibration amplitude A and the azimuth orientation $\theta_r$ of wave antinode of the first-order resonance mode output from the vibration mode shape extraction means 11 and the cosine wave signal $\cos(\omega_r t)$ output from the reference signal generation means 10, the plurality of actuator AC drive signals $f_{RESj}$ (j=1, 2, . . . , 16) for controlling the vibration amplitude A of the first-order resonance mode excited in the hemispherical resonator 2 to be a constant value set in advance, and realizing a free rotation of the first-order resonance mode about the angle measurement axis 1 are generated.

In the actuator drive signal composition means 16, each of the plurality of actuator DC drive signals $f_{NQj}$ (j=1, 2, . . . 16) output from the nodal quadrature vibration control means 13 and each of the plurality of actuator AC drive signals $f_{RESj}$ (j=1, 2, . . . , 16) output from the resonance control means 14 are added to each other, and the addition results are output as the addition signals to the actuators $D_j$ (j=1, 2, . . . , 16). In this way, through control of the actuators $D_j$ (j=1, 2, . . . , 16) based on the addition signals, a state in which only the first-order resonance mode is excited in the hemispherical resonator 2 by the actuator DC drive signals $f_{NQj}$ (j=1, 2, . . . 16) is realized, and further, the vibration amplitude A of the first-order resonance mode is controlled to be the constant value set in advance by the actuator AC drive signals $f_{RESj}$ (j=1, 2, . . . , 16).

On this occasion, the rotational angle $\theta$ in the angle measurement axis 1 direction can be detected by multiplying the azimuth orientation $\theta_r$ of wave antinode of the first-order resonance mode output from the vibration mode shape extraction means 11 by an angular scale factor $K_\theta$ set in advance with use of the angular scale factor multiplication means 15.

Figure 4:
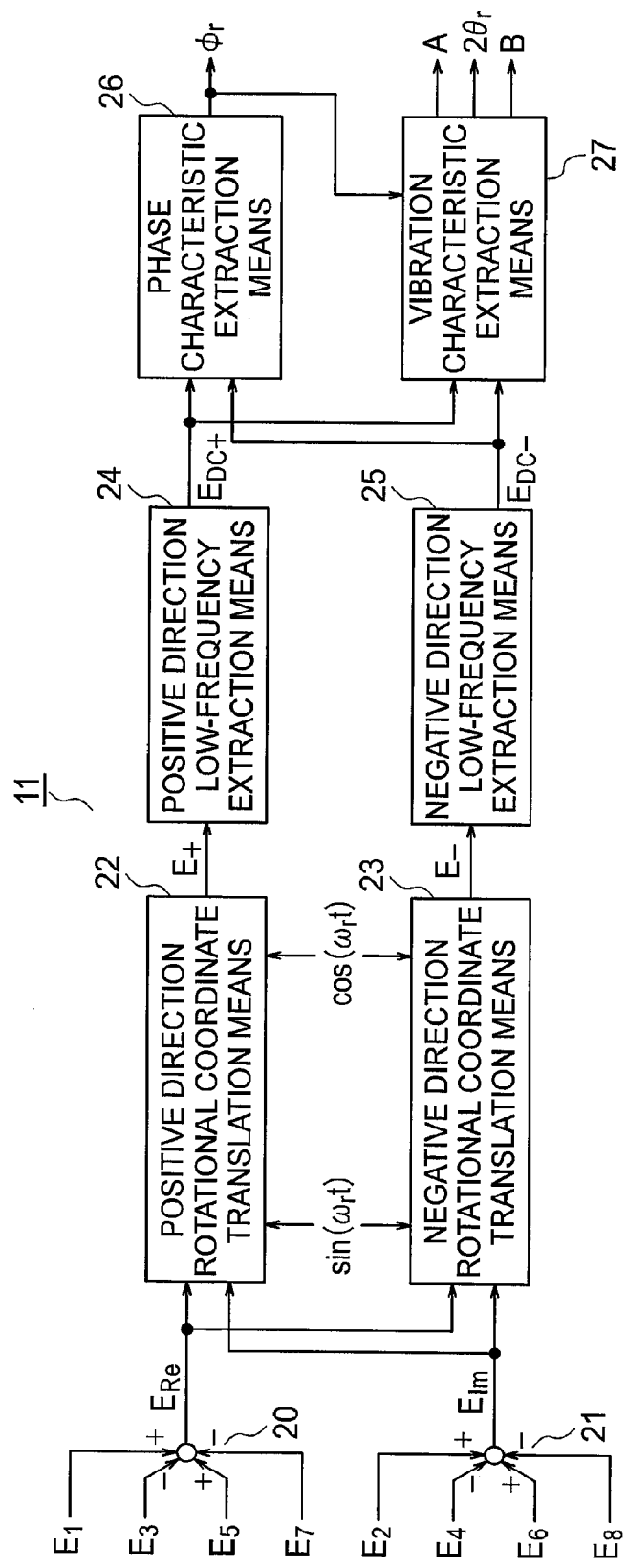
FIG. 4 is a block diagram for illustrating an internal configuration of vibration mode shape extraction means according to the first to fourth embodiments of the present invention.
Figure 5:
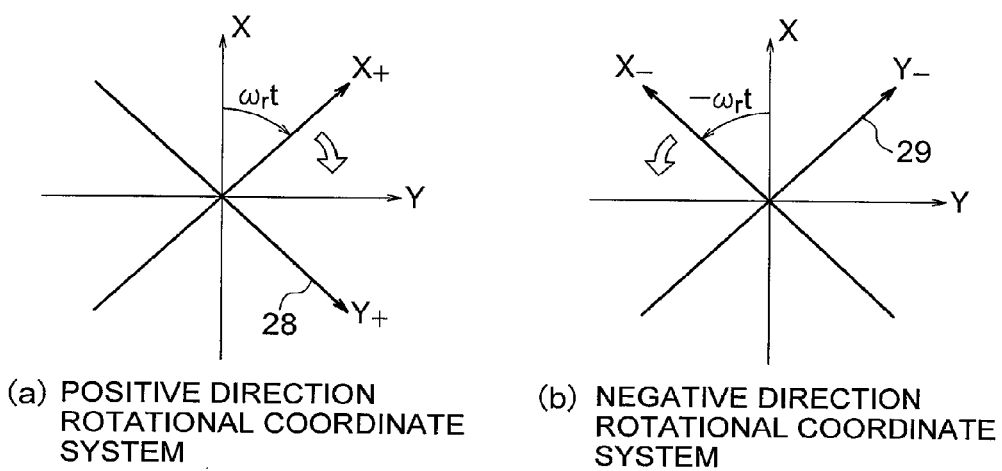
FIG. 5 are schematic diagrams for illustrating an overview of a positive direction rotational coordinate system and a negative direction rotational coordinate system in the vibration mode shape extraction means according to the first to fourth embodiments of the present invention.

FIG. 4 is a block diagram for illustrating an internal configuration of the vibration mode shape extraction means 11 in the hemispherical resonator gyro according to the first embodiment of the present invention. FIG. 5 are schematic diagrams for illustrating an overview of a positive direction rotational coordinate system 28 and a negative direction rotational coordinate system 29 in the wave mode shape extraction means 11 according to the first embodiment of the present invention.

As illustrated in FIG. 4, the vibration mode shape extraction means 11 of the hemispherical resonator gyro according to the first embodiment includes first composition means 20, second composition means 21, positive direction rotational coordinate translation means 22, negative direction rotational coordinate translation means 23, positive direction low-frequency extraction means 24, negative direction low-frequency extraction means 25, phase characteristic extraction means 26, and vibration characteristic extraction means 27.

In this configuration, first, the first composition means 20 composes the displacement sensor outputs $E_k$ (k=1, 3, 5, 7) output from the displacement sensors $S_k$ (k=1, 3, 5, 7) arranged in the directions of the first orthogonal axes (X-Y orthogonal axes of FIG. 2) orthogonal to the angle measurement axis 1.

Moreover, the second composition means 21 composes the displacement sensor outputs $E_k$ (k=2, 4, 6, 8) output from the displacement sensors $S_k$ (k=2, 4, 6, 8) arranged in the directions of the second orthogonal axes that are orthogonal to the angle measurement axis 1 and displaced in the phase by 45 degrees about the angle measurement axis 1 with respect to the first orthogonal axes.

Then, a complex representation $E_{Ro}+jE_{Im}$, which has an output from the first composition means 20 as a real part $E_{Re}$, and has an output from the second composition means 21 as an imaginary part $E_{Im}$, is output to the positive direction rotational coordinate translation means 22 and the negative direction rotational coordinate translation means 23.

As illustrated in FIG. 5(a), in the positive direction rotational coordinate translation means 22, based on the sine wave signal $\sin(\omega_r t)$ and the cosine wave signal $\cos(\omega_r t)$ output from the reference signal generation means 10, the complex representation $E_{Re}+jE_{Im}$ is translated to a representation $E_+$ in a positive direction rotational coordinate system 28 rotating in the positive direction at a rotational speed $\omega_r$ matching the actuator drive frequency $\omega_r$.

Similarly, as illustrated in FIG. 5(b), in the negative direction rotational coordinate translation means 23, based on the sine wave signal $\sin(\omega_r t)$ and the cosine wave signal $\cos(\omega_r t)$ output from the reference signal generation means 10, the complex representation $E_{Re}+jE_{Im}$ is translated to a representation $E_-$ in a negative direction rotational coordinate system 29 rotating in the negative direction at a rotational speed $-\omega_r$ matching the actuator drive frequency $\omega_r$.

The positive direction rotational coordinate system representation $E_+$ output from the positive direction rotational coordinate translation means 22 and the negative direction rotational coordinate system representation $E_-$ output from the negative direction rotational coordinate translation means 23 are respectively input to the positive direction low-frequency extraction means 24 and the negative direction low-frequency extraction means 25.

The positive direction low frequency extraction means 24 extracts a low-frequency component $E_{DC+}$ set in advance from the positive direction rotational coordinate system representation $E_+$ output from the positive direction rotational coordinate translation means 22.

The negative direction low frequency extraction means 25 extracts a low-frequency component $E_{DC-}$ set in advance from the negative direction rotational coordinate system representation $E_-$ output from the negative direction rotational coordinate translation means 23.

In the phase characteristic extraction means 26, based on the low-frequency component $E_{DC+}$ output from the positive direction low-frequency extraction means 24 and the low-frequency component $E_{DC-}$ output from the negative direction low-frequency extraction means 25, the resonance phase characteristic $\varphi_r$ for the actuator AC drive signals $f_{RESj}$ (j=1, 2, . . . , 16) of the first-order resonance mode excited in the hemispherical resonator 2 is calculated and output.

Moreover, in the vibration characteristic extraction means 27, based on the low-frequency component $E_{DC+}$ output from the positive direction low frequency extraction means 24, the low-frequency component $E_{DC-}$ output from the negative direction low frequency extraction means 25, and the resonance phase characteristic $\varphi_r$ output from the phase characteristic extraction means 26, the vibration amplitude A and the azimuth orientation $\theta_r$ of wave antinode of the first-order resonance mode excited in the hemispherical resonator 2, and the vibration amplitude B of the nodal quadrature vibration excited in the hemispherical resonator are calculated and output.

Figure 6:
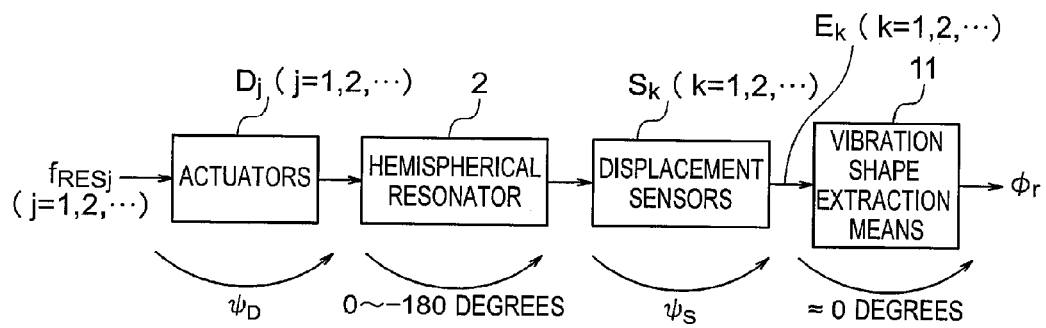
FIG. 6 is a block diagram for illustrating an overview of a phase relationship from actuator AC drive signals output from resonance control means to a resonance phase characteristic with respect to the actuator AC drive signals of the resonance mode extracted by the vibration mode shape extraction means in drive frequency correction means according to the first to fourth embodiments of the present invention.
Figure 7:
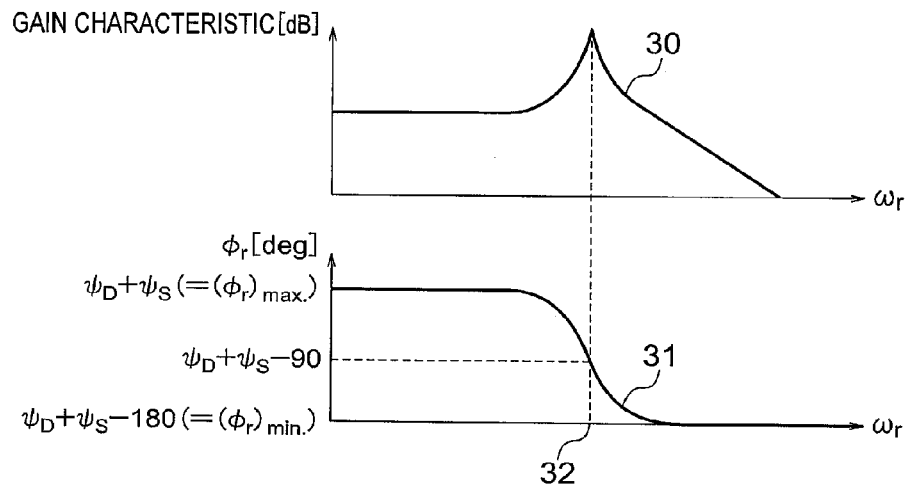
FIG. 7 is a schematic chart for showing a frequency characteristic of the hemispherical resonator displacement with respect to the actuator AC drive signals output from the resonance control means in the drive frequency correction means according to the first to fourth embodiments of the present invention.
Figure 8:
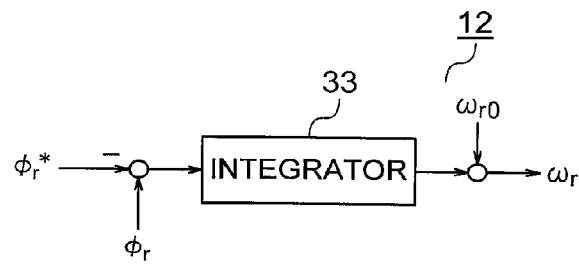
FIG. 8 is a block diagram for illustrating an internal configuration of the drive frequency correction means according to the first to fourth embodiments of the present invention.

FIG. 6 is a block diagram for illustrating an overview of a phase relationship from actuator AC drive signals $f_{RESj}$ (j=1, 2, . . . , 16) output from the resonance control means 14 to the resonance phase characteristic $\varphi_r$ extracted by the vibration mode shape extraction means 11 in the hemispherical resonator gyro according to the first embodiment of the present invention. FIG. 7 is a schematic chart for showing a frequency characteristic of the hemispherical resonator displacement with respect to the actuator AC drive signals $f_{RESj}$ (j=1, 2, . . . , 16) in the drive frequency correction means 12 according to the first embodiment of the present invention. FIG. 8 is a block diagram for illustrating an internal configuration of the drive frequency correction means 12 according to the first embodiment of the present invention.

In the hemispherical resonator gyro according to the present invention, as illustrated in FIG. 6, in the actuator $D_j$ (j=1, 2, . . . , 16), as a characteristic from the actuator AC drive signal $f_{RESj}$ (j=1, 2, . . . , 16) to a true radial attraction force acting on the hemispherical resonator 2, a phase characteristic $\psi_D$ exists at the actuator drive frequency $\omega_r$. Moreover, also in the displacement sensor $S_k$ (k=1, 2, . . . , 8), as a characteristic from a true radial displacement in the hemispherical resonator 2 to the displacement sensor output $E_k$ (k=1, 2, . . . , 8), a phase characteristic $\psi_S$ exists at the actuator drive frequency $\omega_r$. On the other hand, a phase characteristic from the true radial attraction force to the true radial displacement in the hemispherical resonator 2 changes from 0 degree to −180 degrees depending on the actuator drive frequency $\omega_r$, and a phase characteristic from the displacement sensor output $E_k$ (k=1, 2, . . . , 8) to the resonance phase characteristic $\varphi_r$ in the vibration mode shape extraction means 11 is approximately 0 degree independently of the actuator drive frequency $\omega_r$.

Based on the phase relationships illustrated in FIG. 6, the frequency characteristic of the hemispherical resonator displacement with respect to the actuator AC drive signal $f_{RESj}$ (j=1, 2, . . . , 16) is as illustrated in FIG. 7, and a gain characteristic 30 has a resonance peak at a first-order resonance frequency 32 of the hemispherical resonator 2. On the other hand, a phase characteristic 31 relating to the resonance phase characteristic $\varphi_r$ changes from $\psi_D+\psi_S$ degrees to $\psi_D+\psi_S-180$ degrees depending on the actuator drive frequency $\omega_r$, and is $\psi_D+\psi_S-90$ degrees at the first-order resonance frequency 32 of the hemispherical resonator 2.

As illustrated in FIG. 8, the drive frequency correction means 12 of the hemispherical resonator gyro according to the first embodiment includes an integrator 33, and is configured to use the integrator 33 to integrate a signal acquired by subtracting a resonance phase characteristic command $\varphi_r{}^*$ from the resonance phase characteristic $\varphi_r$ output from the vibration mode shape extraction means 11, and to control the actuator drive frequency $\omega_r$ based on a sum of an output from the integrator 33 and an initial value $\omega_{r0}$ of the actuator drive frequency.

Figure 9:
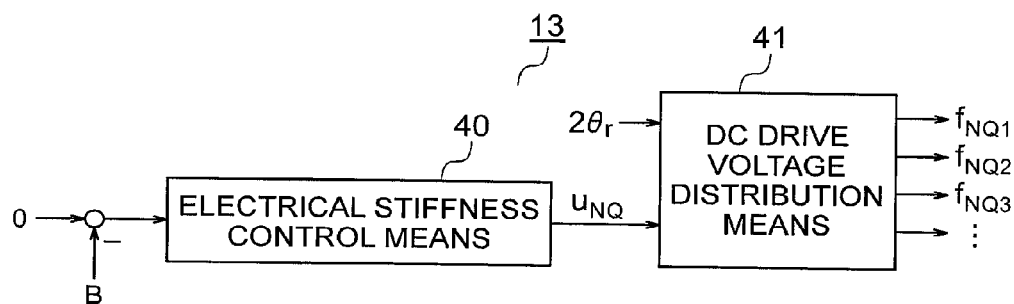
FIG. 9 is a block diagram for illustrating an internal configuration of wave node nodal quadrature vibration control means according to the first to fourth embodiments of the present invention.
Figure 10:
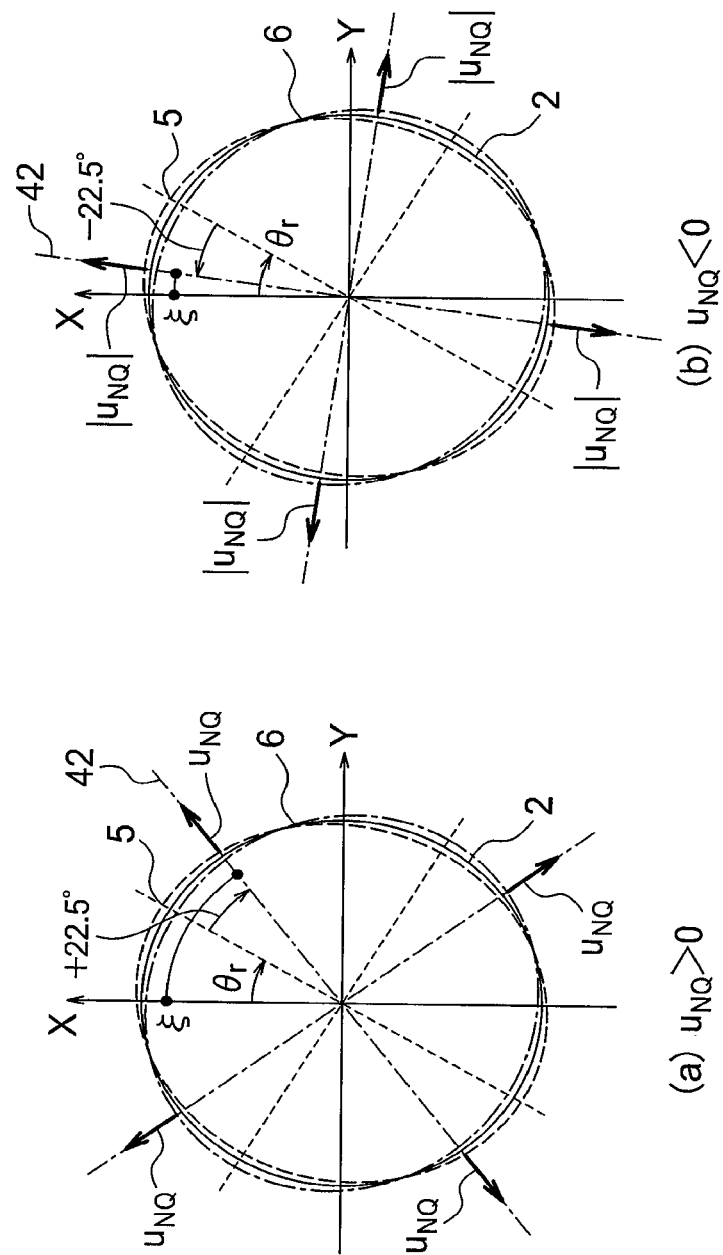
FIG. 10 are schematic diagrams for illustrating an overview of an operation in the nodal quadrature vibration control means according to the first to fourth embodiments of the present invention.

FIG. 9 is a block diagram for illustrating an internal configuration of the nodal quadrature vibration control means 13 in the hemispherical resonator gyro according to the first embodiment of the present invention. FIG. 10 are schematic diagrams for illustrating an overview of an operation in the nodal quadrature vibration control means 13 according to the first embodiment of the present invention.

As illustrated in FIG. 9, the nodal quadrature vibration control means 13 of the hemispherical resonator gyro according to the first embodiment includes electrical stiffness control means 40 and DC drive voltage distribution means 41.

The electrical stiffness control means 40 is configured to generate, based on an inverted sign of the vibration amplitude B of the nodal quadrature vibration output from the vibration mode shape extraction means 11, an electrical stiffness correction command $u_{NQ}$ for suppressing a nodal quadrature vibration.

In the DC drive voltage distribution means 41, based on the electrical stiffness correction command $u_{NQ}$ output from the electrical stiffness control means 40 and the azimuth orientation $\theta_r$ of wave antinode of the first-order resonance mode output from the vibration mode shape extraction means 11, when the electrical stiffness correction command $u_{NQ}$ has a positive sign, as illustrated in FIG. 10(a), orthogonal axis directions displaced in the phase by +22.5 degrees with respect to the azimuth orientation $\theta_r$ of wave antinode are set as electrical stiffness correction axes 42 for the hemispherical resonator 2. On the other hand, when the electrical stiffness correction command $u_{NQ}$ has a negative sign, as illustrated in FIG. 10(b), orthogonal axis directions displaced in the phase by −22.5 degrees with respect to the azimuth orientation $\theta_r$ of wave antinode are set as the electrical stiffness correction axes 42 for the hemispherical resonator 2. Further, as illustrated by a thick arrow of FIG. 10, the actuator DC drive signal $f_{NQj}$ (j=1, 2, . . . 16) is distributed to each one of actuators arranged on both sides of the electrical stiffness correction axes 42 so that the radial attraction forces corresponding to the absolute value of the electrical stiffness correction command $u_{NQ}$ act on the hemispherical resonator 2 along the electrical stiffness correction axes 42.

Figure 11:
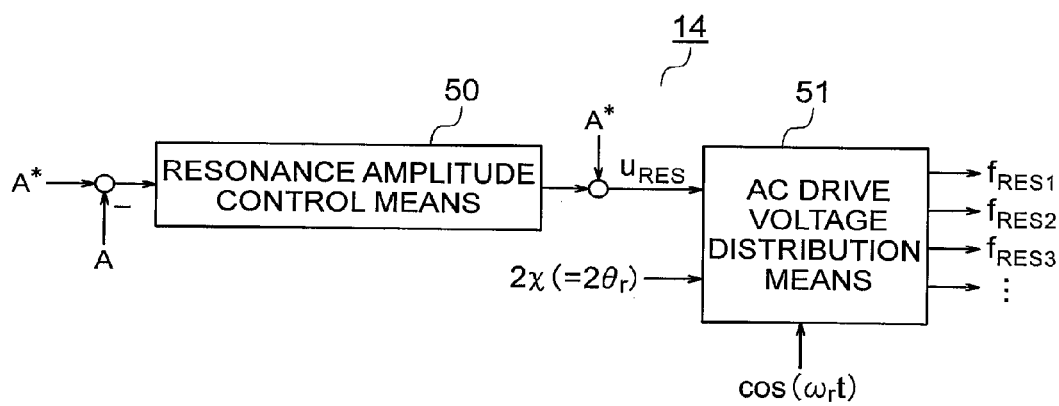
FIG. 11 is a block diagram for illustrating an internal configuration of the resonance control means according to the first and second embodiments of the present invention.
Figure 12:
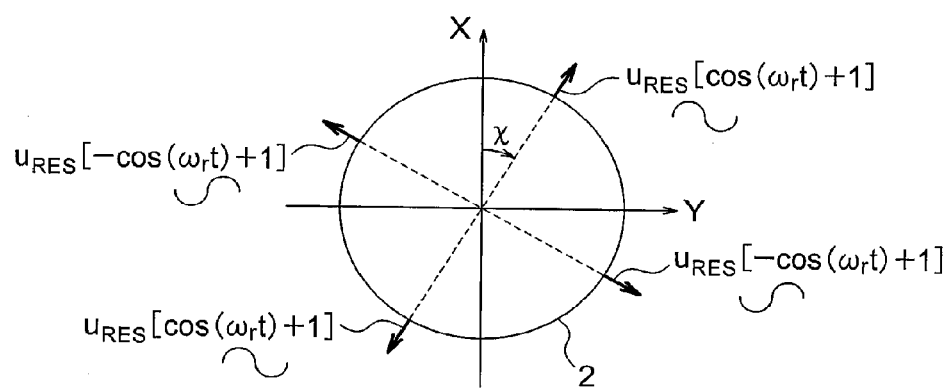
FIG. 12 is a schematic diagram for illustrating an overview of an operation in the resonance control means according to the first to fourth embodiments of the present invention.

FIG. 11 is a block diagram for illustrating an internal configuration of the resonance control means 14 in the hemispherical resonator gyro according to the first embodiment of the present invention. FIG. 12 is a schematic diagram for illustrating an overview of an operation in the resonance control means 14 according to the first embodiment of the present invention.

As illustrated in FIG. 11, the resonance control means 14 of the hemispherical resonator gyro according to the first embodiment includes resonance amplitude control means 50 and AC drive voltage distribution means 51.

In this configuration, first, a vibration amplitude deviation between the vibration amplitude A of the first-order resonance mode excited in the hemispherical resonator 2 output from the vibration mode shape extraction means 11 and a vibration amplitude command A* set to a constant value in advance is input to the resonance amplitude control means 50.

In the resonance amplitude control means 50, such a control command as to bring the vibration amplitude deviation to zero is calculated, and a sum of this control command and the vibration amplitude command A* is output as a resonance amplitude command $u_{RES}$ to the AC drive voltage distribution means 51.

The AC drive voltage distribution means 51 sets the azimuth orientation $\theta_r$ of wave antinode of the first-order resonance mode excited in the hemispherical resonator 2 output from the vibration mode shape extraction means 11 as a resonance phase command $\chi$, and distributes the actuator AC drive signals $f_{RESj}$ (j=1, 2, . . . , 16) to the actuators $D_j$ (j=1, 2, . . . , 16) based on the resonance amplitude command $u_{RES}$, the resonance phase command $\chi$, and the cosine wave signal $\cos(\omega_r t)$ output from the reference signal generation means 10.

In particular, as illustrated by thick arrows of FIG. 12, the AC drive voltage distribution means 51 according to the first embodiment of the present invention is configured to distribute the actuator AC drive signal $f_{RESj}$ (j=1, 2, . . . , 16) to each one of the actuators arranged on both sides of the orthogonal axes so that radial attraction forces $u_{RES}$ [cos $(\omega_r t)+1]$ and $u_{RES}[-\cos(\omega_r t)+1]$ opposite in the phase determined by the resonance amplitude command $u_{RES}$ and the cosine wave signal $\cos(\omega_r t)$ act on the hemispherical resonator 2 alternately at an interval of 90 degrees along the orthogonal axes defined by the resonance phase command $\chi$.

Next, a description is given of an operation of the hemispherical resonator gyro according to the first embodiment of the present invention.

As illustrated in FIG. 1 and FIG. 2, the hemispherical resonator 2 of the hemispherical resonator gyro according to the first embodiment of the present invention is in the hemispherical shape axisymmetric with respect to the angle measurement axis 1 (Z axis), and is supported by the angle measurement axis 1 via the upper housing 3 and the lower housing 4. On the upper housing 3, the total of 16 actuators $D_j$ (j=1, 2, . . . , 16) are arranged at the interval of 22.5 degrees about the angle measurement axis 1, and, through control of the radial attraction forces generated on the respective actuators $D_j$ (j=1, 2, . . . , 16) for the hemispherical resonator 2, the first-order resonance mode is generated. Further, on the lower housing 4, the total of 8 displacement sensors $S_k$ (k=1, 2, . . . , 8) are arranged at the interval of 45 degrees about the angle measurement axis 1, and are configured to detect the radial displacements of the vibration excited in the hemispherical resonator 2.

The first-order resonance mode excited in the hemispherical resonator 2 is the elliptical shape on the plane (XY plane) perpendicular to the angle measurement axis 1. For example, when, as the actuator AC drive signals $f_{RES1}$ and $f_{RES9}$, and $f_{RES5}$ and $f_{RES13}$ for pairs of the actuators $D_1$ and $D_9$, and $D_5$ and $D_{13}$ illustrated in FIG. 2, cosine wave drive signals having the same amplitude and the opposite phase represented by Expression (1) are applied, in the hemispherical resonator 2, a first-order resonance mode is excited in which the elliptical shape having the major axis in the X axis direction represented by the broken line and the elliptical shape having the major axis in the Y axis direction represented by the long dashed short dashed line are alternately repeated at the ½ cycle.

$$f_{RES1},f_{RES9}=u_{RES}[\cos(\omega_r t)+1]$$

$$f_{RES5},f_{RES13}=u_{RES}[-\cos(\omega_r t)+1] \quad (1)$$

In an ideal hemispherical resonator 2 completely uniform in the density and the stiffness of the hemispherical portion, only the first-order resonance mode is excited in the hemispherical resonator 2 by the above-mentioned forced excitation by the actuator $D_j$ (j=1, 2, . . . , 16). However, in the actual hemispherical resonator 2 non-uniform in the density and the stiffness, for example, a nodal quadrature vibration having the wave node of the first-order resonance mode represented by the point 6 of FIG. 2 as a new wave antinode, and vibrating at a phase difference of 90 degrees from the first-order resonance mode is generated, and this vibration causes a drift of the rotational angle detected by the hemispherical resonator gyro.

As illustrated in FIG. 3, the first-order resonance mode excited in the hemispherical resonator 2 and the radial displacement caused by the nodal quadrature vibration are detected by the displacement sensors $S_k$ (k=1, 2, . . . , 8), and the displacement sensor outputs $E_k$ (k=1, 2, . . . 8) on this occasion are generally given by Expression (2).

$$E_k = \begin{cases} \pm \text{Re}[Ae^{j\cdot 2\theta_r}\cos(\omega_r t+\phi_r)+j\cdot Be^{j\cdot 2\theta_r}\sin(\omega_r t+\phi_r)] & (+:k=1,5 \quad -:k=3,7) \\ \pm \text{Re}[Ae^{j\cdot 2\theta_r}\cos(\omega_r t+\phi_r)+j\cdot Be^{j\cdot 2\theta_r}\sin(\omega_r t+\phi_r)] & (+:k=2,6 \quad -:k=4,8) \end{cases}$$

$$= \begin{cases} \pm \frac{1}{2}\text{Re}[A\{e^{j\cdot(\omega_r t+\phi_r+2\theta_r)}+e^{j\cdot(-\omega_r t-\phi_r+2\theta_r)}\}+B\{e^{j\cdot(\omega_r t+\phi_r+2\theta_r)}-e^{j\cdot(-\omega_r t-\phi_r+2\theta_r)}\}] & (+:k=1,5 \quad -:k=3,7) \\ \pm \frac{1}{2}\text{Im}[A\{e^{j\cdot(\omega_r t+\phi_r+2\theta_r)}+e^{j\cdot(-\omega_r t-\phi_r+2\theta_r)}\}+B\{e^{j\cdot(\omega_r t+\phi_r+2\theta_r)}-e^{j\cdot(-\omega_r t-\phi_r+2\theta_r)}\}] & (+:k=2,6 \quad -:k=4,8) \end{cases} \quad (2)$$

Note that:

A: vibration amplitude of first-order resonance mode, $\theta_r$: azimuth orientation of wave antinode of first-order resonance mode, $\varphi_r$: resonance phase characteristic with respect to actuator AC drive signal of first-order resonance mode, B: vibration amplitude of nodal quadrature vibration, and $\omega_r$: actuator drive frequency≈first-order resonance frequency.

In the vibration mode shape extraction means 11, the displacement sensor outputs $E_k$ (k=1, 2, . . . , 8) given by Expression (2), and the sine wave signal $\sin(\omega_r t)$ and the cosine wave signal $\cos(\omega_r t)$ corresponding to the actuator drive frequency $\omega_r$ generated by the reference signal generation means 10 are input, and the vibration amplitude A and the azimuth orientation $\theta_r$ of wave antinode of the first-order resonance mode excited in the hemispherical resonator 2, the resonance phase characteristic $\varphi_r$ corresponding to the actuator AC drive signals $f_{RESj}$ (j=1, 2, . . . , 16), and the vibration amplitude B of the nodal quadrature vibration excited in the hemispherical resonator are extracted.

Specifically, as illustrated in FIG. 4, the displacement sensor outputs $E_k$ (k=1, 3, 5, 7) output from the displacement sensors $S_k$ (k=1, 3, 5, 7) arranged in the directions of the first orthogonal axes (X-Y orthogonal axes of FIG. 2), and the displacement sensor outputs $E_k$ (k=2, 4, 6, 8) output from the displacement sensors $S_k$ (k=2, 4, 6, 8) arranged in the directions of the second orthogonal axes displaced in the phase by 45 degrees with respect to the first orthogonal axes about the angle measurement axis 1 are respectively composed by the first composition means 20 and the second composition means 21 by following Expression (3).

$$E_{Re}=E_1-E_3+E_5-E_7=2Re[A \\ \{e^{j\cdot(\omega_r t+\varphi_r+2\theta_r)}+e^{j\cdot(-\omega_r t-\varphi_r+2\theta_r)}\}+ \\ B\{e^{j\cdot(\omega_r t+\varphi_r+2\theta_r)}-e^{j\cdot(-\omega_r t-\varphi_r+2\theta_r)}\}]$$

$$E_{Im}=E_2-E_4+E_6-E_8=2Im[A \\ \{e^{j\cdot(\omega_r t+\varphi_r+2\theta_r)}+e^{j\cdot(-\omega_r t-\varphi_r+2\theta_r)}\}+B \\ \{e^{j\cdot(\omega_r t+\varphi_r+2\theta_r)}-e^{j\cdot(-\omega_r t-\varphi_r+2\theta_r)}\}] \quad (3)$$

Then, the complex representation having the output $E_{Ro}$ from the first composition means 20 as the real part and the output $E_{Im}$ from the second composition means 21 as the imaginary part represented by Expression (4) is acquired, and is input to the positive direction rotational coordinate translation means 22 and the negative direction rotational coordinate translation means 23 along with the sine wave signal $\sin(\omega_r t)$ and the cosine wave signal $\cos(\omega_r t)$.

$$E=E_{Re}+jE_{Im} \quad (4)$$

In the positive direction rotational coordinate translation means 22 and the negative direction rotational coordinate translation means 23, Expression (5) is used to translate the complex representation E given by Expression (4) to representations $E_+$ and $E_-$ in the positive direction rotational coordinate system 28 and the negative direction rotational coordinate system 29 respectively rotating in the positive and negative directions at the rotational speed matching the actuator drive frequency $\omega_r$ illustrated in FIG. 5.

$$E_+ = E \cdot e^{-j\omega_r t} = (E_{Re} + jE_{Im}) \cdot (\cos(\omega_r t) - j\sin(\omega_r t)) = 2[(A+B)e^{j\cdot(\varphi_r + 2\theta_r)} + (A-B)e^{j\cdot(-2\omega_r t - \varphi_r + 2\theta_r)}]$$

$$E_- = E \cdot e^{j\omega_r t} = (E_{Re} + jE_{Im}) \cdot (\cos(\omega_r t) - j\sin(\omega_r t)) = 2[(A-B)e^{j\cdot(-\varphi_r + 2\theta_r)} + (A+B)e^{j\cdot(2\omega_r t + \varphi_r + 2\theta_r)}] \quad (5)$$

The low-frequency components $E_{DC+}$ and $E_{DC-}$ represented by Expression (6) are extracted from the positive direction rotational coordinate system representation $E_+$ and the negative direction rotational coordinate system representation $E_-$ given by Expression (5), respectively by the positive direction low-frequency extraction means 24 and the negative direction low-frequency extraction means 25.

$$E_{DC+} = 2(A+B)e^{j\cdot(\varphi_r + 2\theta_r)}$$

$$E_{DC-} = 2(A-B)e^{j\cdot(-\varphi_r + 2\theta_r)} \quad (6)$$

Moreover, the resonance phase characteristic $\varphi_r$ for the actuator AC drive signals $f_{RESj}$ (j=1, 2, ..., 16) of the first-order resonance mode excited in the hemispherical resonator 2 is calculated by the phase characteristic extraction means 26 from the low-frequency components $E_{DC+}$ and $E_{DC-}$ by using Expression (7).

$$\phi_r = \frac{1}{2}\text{atan2}\left[\text{Im}\left(\frac{E_{DC+}}{E_{DC-}}\right), \text{Re}\left(\frac{E_{DC+}}{E_{DC-}}\right)\right] = \quad (7)$$
$$\frac{1}{2}\text{atan2}\left[\text{Im}\left(\frac{A+B}{A-B}e^{j2\phi_r}\right), \text{Re}\left(\frac{A+B}{A-B}e^{r2\phi_r}\right)\right]$$

Note that, on this occasion, the actual vibration amplitudes of the first-order resonance mode and the nodal quadrature vibration have a relationship represented by Expression (8).

$$A > |B| \geq 0 \quad (8)$$

Further, in the vibration characteristic extraction means 27, Ea and Eb represented by Expression (9) are calculated based on the outputs $E_{DC+}$ and $E_{DC-}$ (refer to Expression (6)) from the positive direction low-frequency extraction means 24 and the negative direction low-frequency extraction means 25 and the vibration phase characteristic $\varphi_r$ (refer to Expression (7)) output from the phase characteristic extraction means 26.

$$E_a = E_{DC+}e^{-j\varphi_r} + E_{DC-}e^{j\varphi_r} = 4Ae^{j2\theta_r}$$

$$E_b = E_{DC+}e^{-j\varphi_r} + E_{DC-}e^{j\varphi_r} = 4Be^{j2\theta_r} \quad (9)$$

The vibration characteristic extraction means 27 is configured to use Ea and Eb to calculate the azimuth orientation $\theta_r$ of wave antinode of the first-order resonance mode excited in the hemispherical resonator 2 by using Expression (10), calculate the vibration amplitude A by using Expression (11), and calculate the vibration amplitude B of the nodal quadrature vibration by using Expression (12).

$$2\theta_r = \text{atan2}[\text{Im}(E_a), \text{Re}(E_a)] \quad (10)$$

$$A = \frac{1}{4}E_a e^{-j\cdot 2\theta_r} \quad (11)$$

$$B = \frac{1}{4}E_b e^{-j\cdot 2\theta_r} \quad (12)$$

The drive frequency correction means 12 illustrated in FIG. 3 is configured to correct, based on the resonance phase characteristic $\varphi_r$ output from the vibration mode shape extraction means 11, the actuator drive frequency $\omega_r$ so that the actuator drive frequency $\omega_r$ matches the first-order resonance frequency of the hemispherical resonator 2.

In general, the phase relationship from the actuator AC drive signals $f_{RESj}$ (j=1, 2, ..., 16) to the resonance phase characteristic $\varphi_r$ extracted by the vibration mode shape extraction means 11 is as illustrated in FIG. 6. In other words, in the resonance phase characteristic $\varphi_r$, as well as the phase characteristic changing from 0 degree to −180 degrees depending on the actuator drive frequency $\omega_r$ from the true radial attraction force to the true radial displacement in the hemispherical resonator 2, there exist the phase characteristic $\psi_D$ from the actuator AC drive signals $f_{RESj}$ (j=1, 2, ..., 16) in the actuators $D_j$ (j=1, 2, ..., 16) to the true radial attraction forces acting on the hemispherical resonator 2 and the phase characteristic $\psi_S$ from the true radial displacement in the hemispherical resonator 2 to the displacement sensor outputs $E_k$ (k=1, 2, ..., 8) in the displacement sensors $S_k$ (k=1, 2, ..., 8).

Thus, the frequency characteristics of the hemispherical resonator displacement with respect to the actuator AC drive signal $f_{RESj}$ (j=1, 2, ..., 16) are as illustrated in FIG. 7. In other words, the phase characteristic 31 relating to the resonance phase characteristic $\varphi_r$ changes from $\psi_D + \psi_S$ to $\psi_D + \psi_S - 180$ degrees depending on the actuator drive frequency $\omega_r$, and is $\psi_D + \psi_S - 90$ degrees at the first-order resonance frequency 32 of the hemispherical resonator 2.

Thus, in the drive frequency correction means 12, the actuator phase characteristic $\psi_D$ at the actuator drive frequency $\omega_r$ and the displacement sensor phase characteristic $\psi_S$ are used to set the resonance phase characteristic command $\varphi_r^*$ of FIG. 8 to Expression (13), the signal acquired by subtracting the resonance phase characteristic command $\varphi_r^*$ from the resonance phase characteristic $\varphi_r$ is integrated by the integrator 33, the sum of the output from the integrator 33 and the initial value $\omega_{r0}$ of the actuator drive frequency is acquired, and the actuator drive frequency $\omega_r$ is controlled by this sum.

$$\varphi_r^* = \psi_D + \psi_S - 90 [\text{deg}] \quad (13)$$

As a result,
(a) when the actuator drive frequency $\omega_r <$ the first-order resonance frequency 32 of hemispherical resonator 2
↔ the resonance phase characteristic $\varphi_r >$ the resonance phase characteristic command $\varphi_r^*$,
the actuator drive frequency $\omega_r$ shifts toward the high-frequency side, and
(b) when the actuator drive frequency $\omega_r >$ the first-order resonance frequency 32 of hemispherical resonator 2
↔ the resonance phase characteristic $\varphi_r <$ the resonance phase characteristic command $\varphi_r^*$,
the actuator drive frequency $\omega_r$ shifts toward the low-frequency side.

Therefore, when the actuator drive frequency $\omega_r$=the first-order resonance frequency 32 of hemispherical resonator 2

↔ the resonance phase characteristic $\varphi_r$=the resonance phase characteristic command $\varphi_r^*$, the drive frequency correction means 12 is stabilized, and the true first-order resonance frequency 32 in the hemispherical resonator 2 is highly precisely locked.

thick arrows of FIG. 10, the actuator DC drive signals $f_{NQj}$ (j=1, 2, . . . 16) are determined based on Expression (15) to Expression (18) so that the radial attraction forces corresponding to the absolute value of the electrical stiffness correction command $u_{NQ}$ act on the hemispherical resonator 2 along the electrical stiffness correction axes 42.

Note that $\xi$ is an angle of the electrical stiffness correction axis 42 existing in the first quadrant of the XY plane with respect to X axis.

$$(i)\ 0 \le \xi[\deg] < 22.5 \to f_{NQj} = \begin{cases} |u_{NQ}|[\cos(2\xi) - \sin(2\xi)] & (j = 1, 5, 9, 13) \\ \sqrt{2}\,|u_{NQ}|\sin(2\xi) & (j = 2, 6, 10, 14) \\ 0 & (\text{otherwise}) \end{cases} \quad (15)$$

$$(ii)\ 22.5 \le \xi[\deg] < 45 \to f_{NQj} = \begin{cases} \sqrt{2}\,|u_{NQ}|\cos(2\xi) & (j = 2, 6, 10, 14) \\ |u_{NQ}|[\sin(2\xi) - \cos(2\xi)] & (j = 3, 7, 11, 15) \\ 0 & (\text{otherwise}) \end{cases} \quad (16)$$

$$(iii)\ 45 \le \xi[\deg] < 67.5 \to f_{NQj} = \begin{cases} |u_{NQ}|[\sin(2\xi) + \cos(2\xi)] & (j = 3, 7, 11, 15) \\ -\sqrt{2}\,|u_{NQ}|\cos(2\xi) & (j = 4, 8, 12, 16) \\ 0 & (\text{otherwise}) \end{cases} \quad (17)$$

$$(iv)\ 67.5 \le \xi[\deg] < 90 \to f_{NQj} = \begin{cases} \sqrt{2}\,|u_{NQ}|\sin(2\xi) & (j = 4, 8, 12, 16) \\ -|u_{NQ}|[\sin(2\xi) + \cos(2\xi)] & (j = 1, 5, 9, 13) \\ 0 & (\text{otherwise}) \end{cases} \quad (18)$$

In the nodal quadrature vibration control means 13 illustrated in FIG. 3, based on the vibration amplitude B of the nodal quadrature vibration and the azimuth orientation $\theta_r$ of wave antinode of the first-order resonance mode output from the vibration mode shape extraction means 11, the plurality of actuator DC drive signals $f_{NQj}$ (j=1, 2, . . . , 16) for suppressing the nodal quadrature vibration are generated.

Specifically, as illustrated in FIG. 9, from the inverted sign of the vibration amplitude B in the nodal quadrature vibration, the electrical stiffness correction command $u_{NQ}$ is generated to suppress the nodal quadrature vibration by the electrical stiffness control means 40 constructed by a PI controller having a continuous system transfer function given by Expression (14).

$$K_{NQP} + \frac{K_{NQI}}{s} \quad (14)$$

Note that $K_{NQP}$: proportional gain, and $K_{NQI}$: integration gain.

In the DC drive voltage distribution means 41, based on the sign of the electrical stiffness correction command $u_{NQ}$ and the azimuth orientation $\theta_r$ of wave antinode of the first-order resonance mode output from the vibration mode shape extraction means 11, when the electrical stiffness correction command $u_{NQ}$ has a positive sign, as illustrated in FIG. 10(a), the orthogonal axis directions displaced in the phase by +22.5 degrees with respect to the azimuth orientation $\theta_r$ of wave antinode are set as the electrical stiffness correction axes 42 for the hemispherical resonator 2. On the other hand, when the electrical stiffness correction command $u_{NQ}$ has a negative sign, as illustrated in FIG. 10(b), the orthogonal axes direction displaced in the phase by −22.5 degrees with respect to the azimuth orientation $\theta_r$ of wave antinode are set as the electrical stiffness correction axes 42 for the hemispherical resonator 2. Then, as illustrated by the This corresponds to the use of each of the actuators arranged on the both sides of the electrical stiffness correction axes 42 to realize the electrical stiffness correction command $u_{NQ}$, and, with this configuration, the non-uniformity in the real actual hemispherical resonator 2 is electrically corrected, thereby suppressing the nodal quadrature vibration.

In the resonance control means 14 illustrated in FIG. 3, based on the amplitude A and the azimuth orientation $\theta_r$ of wave antinode of the first-order resonance output from the vibration mode shape extraction means 11 and the cosine wave signal $\cos(\omega_r t)$ output from the reference signal generation means 10, the actuator AC drive signals $f_{RESj}$ (j=1, 2, . . . , 16) are generated, which control the vibration amplitude A of the first-order resonance mode excited in the hemispherical resonator 2 to be the constant value set in advance, and realize the free rotation of the first-order resonance mode about the angle measurement axis 1.

Specifically, as illustrated in FIG. 11, from the vibration amplitude deviation between the vibration amplitude command A* set to the constant value in advance and the actual vibration amplitude A, such a control command as to bring the vibration amplitude deviation to zero is calculated by the resonance amplitude control means 50 constructed by a PI controller having a continuous system transfer function given by Expression (19), and a sum of this control command and the vibration amplitude command A* is set to the resonance amplitude command $u_{RES}$.

$$K_{AP} + \frac{K_{AI}}{s} \quad (19)$$

Note that $K_{AP}$: proportional gain, and $K_{AI}$: integration gain.

Further, the azimuth orientation $\theta_r$ of wave antinode of the first-order resonance mode excited in the hemispherical resonator 2 is set to the resonance phase command χ as it is, and the resonance amplitude command $u_{RES}$, the resonance phase command χ, and the cosine wave signal $\cos(\omega_r t)$ output from the reference signal generation means 10 are input to the AC drive voltage distribution means 51. In the AC drive voltage distribution means 51, as illustrated by thick arrows of FIG. 12, the actuator AC drive signals $f_{RESj}$ (j=1, 2, . . . , 16) are determined based on Expression (20) to Expression (27) so that radial attraction forces $u_{RES}[\cos(\omega_r t)+1]$ and $u_{RES}[-\cos(\omega_r t)+1]$ opposite in the phase determined by the resonance amplitude command $u_{RES}$ and the cosine wave signal $\cos(\omega_r t)$ act on the hemispherical resonator 2 alternately at the interval of 90 degrees along the orthogonal axes defined by the resonance phase command χ.

order resonance mode is controlled to be the constant value set in advance, and the free rotation about the angle measurement axis 1 is realized.

The actuator DC drive signals $f_{NQj}$ (j=1, 2, . . . 16) and the actuator AC drive signals $f_{RESj}$ (j=1, 2, . . . , 16) illustrated in FIG. 3 are added to each other by the actuator drive signal composition means 16, and the actuators $D_j$ (j=1, 2, . . . , 16) are controlled based on the added signals. On this occasion, the rotational angle θ in the angle measurement axis 1 direction is detected by multiplying the azimuth orientation $\theta_r$ of wave antinode of the first-order resonance mode output from the vibration mode shape extraction means 11 by the angular scale factor $K_\theta$ set in advance by the angular scale factor multiplication means 15.

$$(i) \ 0 \leq \chi[\deg] < 22.5 \rightarrow f_{RESj} = \begin{cases} u_{RES}[\pm\cos(\omega_r t)+1](\cos(2\chi)-\sin(2\chi)) & (+: j=1,9, \ -: j=5,13) \\ \sqrt{2} u_{RES}[\pm\cos(\omega_r t)+1]\sin(2\chi) & (+: j=2,10, \ -: j=6,14) \\ 0 & (\text{otherwise}) \end{cases} \quad (20)$$

$$(ii) \ 22.5 \leq \chi[\deg] < 45 \rightarrow f_{RESj} = \begin{cases} \sqrt{2} u_{RES}[\pm\cos(\omega_r t)+1]\cos(2\chi) & (+: j=2,10, \ -: j=6,14) \\ u_{RES}[\pm\cos(\omega_r t)+1](\sin(2\chi)-\cos(2\chi)) & (+: j=3,11, \ -: j=7,15) \\ 0 & (\text{otherwise}) \end{cases} \quad (21)$$

$$(iii) \ 45 \leq \chi[\deg] < 67.5 \rightarrow f_{RESj} = \begin{cases} u_{RES}[\pm\cos(\omega_r t)+1](\sin(2\chi)+\cos(2\chi)) & (+: j=3,11, \ -: j=7,15) \\ -\sqrt{2} u_{RES}[\pm\cos(\omega_r t)+1]\cos(2\chi) & (+: j=4,12, \ -: j=8,16) \\ 0 & (\text{otherwise}) \end{cases} \quad (22)$$

$$(iv) \ 67.5 \leq \chi[\deg] < 90 \rightarrow f_{RESj} = \begin{cases} \sqrt{2} u_{RES}[\pm\cos(\omega_r t)+1]\sin(2\chi) & (+: j=4,12, \ -: j=8,16) \\ -u_{RES}[\pm\cos(\omega_r t)+1](\sin(2\chi)+\cos(2\chi)) & (+: j=5,13, \ -: j=1,9) \\ 0 & (\text{otherwise}) \end{cases} \quad (23)$$

$$(v) \ -22.5 \leq \chi[\deg] < 0 \rightarrow f_{RESj} = \begin{cases} u_{RES}[\pm\cos(\omega_r t)+1](\sin(2\chi)+\cos(2\chi)) & (+: j=1,9, \ -: j=5,13) \\ -\sqrt{2} u_{RES}[\pm\cos(\omega_r t)+1]\sin(2\chi) & (+: j=8,16, \ -: j=4,12) \\ 0 & (\text{otherwise}) \end{cases} \quad (24)$$

$$(vi) \ -45 \leq \chi[\deg] < -22.5 \rightarrow f_{RESj} = \begin{cases} -u_{RES}[\pm\cos(\omega_r t)+1](\sin(2\chi)+\cos(2\chi)) & (+: j=7,15, \ -: j=3,11) \\ \sqrt{2} u_{RES}[\pm\cos(\omega_r t)+1]\cos(2\chi) & (+: j=8,16, \ -: j=4,12) \\ 0 & (\text{otherwise}) \end{cases} \quad (25)$$

$$(vii) \ -67.5 \leq \chi[\deg] < -45 \rightarrow f_{RESj} = \begin{cases} -\sqrt{2} u_{RES}[\pm\cos(\omega_r t)+1]\cos(2\chi) & (+: j=6,14, \ -: j=2,10) \\ u_{RES}[\pm\cos(\omega_r t)+1](\cos(2\chi)-\sin(2\chi)) & (+: j=7,15, \ -: j=3,11) \\ 0 & (\text{otherwise}) \end{cases} \quad (26)$$

$$(viii) \ -90 < \chi[\deg] < -67.5 \rightarrow f_{RESj} = \begin{cases} u_{RES}[\pm\cos(\omega_r t)+1](\sin(2\chi)-\cos(2\chi)) & (+: j=5,13, \ -: j=1,9) \\ -\sqrt{2} u_{RES}[\pm\cos(\omega_r t)+1]\sin(2\chi) & (+: j=6,14, \ -: j=2,10) \\ 0 & (\text{otherwise}) \end{cases} \quad (27)$$

This corresponds to the use of each one of the actuators arranged on both sides of the orthogonal axes defined by the resonance phase command χ to realize the radial attraction forces $u_{RES}[\cos(\omega_r t)+1]$ and $u_{RES}[-\cos(\omega_r t)+1]$, and, with this configuration, the vibration amplitude A of the first- In this way, by the hemispherical resonator gyro according to the first embodiment of the present invention, without using a related-art phase locked loop (PLL), the detailed vibration mode shapes of the first-order resonance mode and the nodal quadrature vibration excited in the hemispherical resonator 2 can be extracted, and thus the operation of the hemispherical resonator gyro can be always stabilized. Moreover, the operation extremely high in the spectral purity and the high phase resolution with respect to the first-order resonance frequency 32 of the hemispherical resonator 2 can be realized, and thus the angle detection resolution of the hemispherical resonator gyro can be increased.

Further, by the hemispherical resonator gyro according to the first embodiment of the present invention, the true first-order resonance frequency 32 in the hemispherical resonator 2 can be highly precisely locked, and thus the phase characteristic of the actuator AC drive signals $f_{RESj}$ (j=1, 2, . . . , 16) for realizing the efficient excitation of the first-order resonance mode for the hemispherical resonator 2 can be generated. Moreover, regarding the actuator AC drive signals $f_{RESj}$ (j=1, 2, . . . , 16) for realizing the free rotation of the first-order resonance mode about the angle measurement axis 1, a control calculation amount required for the generation thereof can be reduced.

In addition, by the hemispherical resonator gyro according to the first embodiment of the present invention, the nodal quadrature vibration can be suppressed, the state in which only the first-order resonance mode is excited can be realized for the hemispherical resonator 2, and thus the drift of the rotational angle detected by the hemispherical resonator gyro can be suppressed.

Note that, in the hemispherical resonator gyro according to the first embodiment of the present invention, the total of 16 actuators and the total of 8 displacement sensors are applied, and the spatial arrangement thereof is set as the configuration of FIG. 2, but the present invention is not limited to this case. Regarding the actuators, the configuration only needs to realize the excitation of the first-order resonance mode for the hemispherical resonator 2 and the suppression of the nodal quadrature vibration, and, regarding the displacement sensors, in two sets of the orthogonal axis directions displaced from each other in the phase by 45 degrees, the configuration only needs to detect the radial displacements of the hemispherical resonator 2.

Moreover, in the hemispherical resonator gyro according to the first embodiment of the present invention, regarding the generation of the actuator AC drive signals $f_{RESj}$ (j=1, 2, . . . , 16), the cosine wave signal $\cos(\omega_r t)$ at the actuator drive frequency $\omega_r$ is applied, but the present invention is not limited to this case. The sine wave signal $\sin(\omega_r t)$ may be applied by appropriately changing the corresponding expressions.

As described above, according to the first embodiment, there is provided a hemispherical resonator gyro, including: a hemispherical resonator 2 in an axisymmetric hemispherical shape with respect to an angle measurement axis 1 serving as a measurement axis, configured to maintain an resonance pattern in a plane perpendicular to the angle measurement axis 1; an upper housing 3 and a lower housing 4 configured to support the hemispherical resonator 2 via the angle measurement axis 1; a plurality of actuators $D_j$ arranged on the upper housing 3 at an equal interval about the angle measurement axis, each configured to generate an attraction force in a radial direction acting on the hemispherical resonator 2; a plurality of displacement sensors $S_k$ arranged on the lower housing 4 at an equal interval about the angle measurement axis, each configured to detect a displacement in a radial direction of the hemispherical resonator 2; reference signal generation means 10 configured to generate a sine wave signal and a cosine wave signal corresponding to a drive frequency of the actuator $D_j$; vibration mode shape extraction means 11 configured to extract, based on the sine wave signal and the cosine wave signal output from the reference signal generation means 10, and the displacement in the radial direction of the hemispherical resonator 2 output from each of the plurality of the displacement sensors $S_k$, a vibration amplitude and a azimuth orientation of wave antinode of a resonance mode excited in the hemispherical resonator 2, a resonance phase characteristic with respect to an AC drive signal for the actuator $D_j$, and a vibration amplitude of a nodal quadrature vibration excited in the hemispherical resonator 2; drive frequency correction means 12 configured to cause, based on the resonance phase characteristic with respect to the AC drive signal for the actuator $D_j$ output from the vibration mode shape extraction means 11, the drive frequency of the actuator $D_j$ to match a resonance frequency of the hemispherical resonator 2; nodal quadrature vibration control means 13 configured to generate, based on the vibration amplitude of the nodal quadrature vibration and the azimuth orientation of wave antinode of the resonance mode output from the vibration mode shape extraction means 11, a DC drive signal for the each of the plurality of actuators $D_j$ to suppress the nodal quadrature vibration; and resonance control means 14 configured to generate, based on the vibration amplitude and the azimuth orientation of wave antinode of the resonance mode output from the vibration mode shape extraction means 11 and the cosine wave signal output from the reference signal generation means 10, the AC drive signal for the each of the plurality of actuators $D_j$ to control the vibration amplitude of the resonance mode excited in the hemispherical resonator 2 to be a constant value set in advance, and to realize a free rotation of the resonance mode about the angle measurement axis, in which a rotational angle in the angle measurement axis direction of the hemispherical resonator 2 is detected from the azimuth orientation of wave antinode of the resonance mode excited in the hemispherical resonator 2.

With this configuration, without using the related-art phase locked loop (PLL), the detailed vibration mode shapes of the first-order resonance mode and the nodal quadrature vibration excited in the hemispherical resonator can be extracted, and thus the operation of the hemispherical resonator gyro can be always stabilized, and the operation extremely high in the spectral purity with respect to the first-order resonance frequency and the highly precise lock of the hemispherical resonator gyro can be enabled.

Moreover, with the vibration mode shape extraction based on this configuration, the high phase resolution can be realized for the first-order resonance frequency of the hemispherical resonator, and the angle detection resolution of the hemispherical resonator gyro can be increased.

Further, with this configuration, the true first-order resonance frequency in the hemispherical resonator can be highly precisely locked, and thus the phase characteristic of the actuator AC drive signals can be generated to realize the efficient excitation of the first-order resonance mode for the hemispherical resonator.

Further, in this embodiment, the vibration mode shape extraction means 11 includes: first composition means 20 configured to compose outputs of the displacement sensors $S_k$ arranged in first orthogonal axis directions orthogonal to the measurement axis 1; second composition means 21 configured to compose outputs of the displacement sensors $S_k$ arranged in second orthogonal axis directions orthogonal to the measurement axis 1, and displaced in the phase by 45 degrees about the measurement axis with respect to the first orthogonal axes; positive direction rotational coordinate translation means 22 configured to translate a complex representation including an output from the first composition means 20 as a real part and an output from the second composition means 21 as an imaginary part into a representation in a rotational coordinate system rotating in a positive direction at a rotational speed matching the drive frequency of the actuator $D_j$; negative direction rotational coordinate translation means 23 configured to translate the complex representation including the output from the first composition means 20 as a real part and the output from the second composition means 21 as an imaginary part into a representation in a rotational coordinate system rotating in a negative direction at the rotational speed matching the drive frequency of the actuator $D_j$; positive direction low-frequency extraction means 24 configured to extract a low-frequency component set in advance from an output of the positive direction rotational coordinate translation means 22; negative direction low-frequency extraction means 25 configured to extract a low-frequency component set in advance from an output of the negative direction rotational coordinate translation means 23; phase characteristic extraction means 26 configured to calculate, based on outputs of the positive direction low-frequency extraction means 24 and the negative direction low-frequency extraction means 25, the resonance phase characteristic with respect to the AC drive signal for the actuator $D_j$ of the resonance mode excited in the hemispherical resonator 2; and vibration characteristic extraction means 27 configured to extract, based on outputs of the positive direction low-frequency extraction means 24 and the negative direction low-frequency extraction means 25 and an output of the phase characteristic extraction means 26, the vibration amplitude and the azimuth orientation of wave antinode of the resonance mode excited in the hemispherical resonator 2 and the vibration amplitude of the nodal quadrature vibration excited in the hemispherical resonator 2.

With this configuration, without using the related-art phase locked loop (PLL), the detailed vibration mode shapes of the first-order resonance mode and the nodal quadrature vibration excited in the hemispherical resonator can be extracted, and thus the operation of the hemispherical resonator gyro can be always stabilized, and further, the operation extremely high in the spectral purity with respect to the first-order resonance frequency of the hemispherical resonator gyro and the high phase resolution for the first-order resonance frequency can be enabled, resulting in the increase in the angle detection resolution of the hemispherical resonator gyro.

Further, in this embodiment, the drive frequency correction means 12 is configured to control the drive frequency of the actuator $D_j$ so that the resonance phase characteristic with respect to the AC drive signal for the actuator $D_j$ output from the vibration mode shape extraction means 11 is fixed to a sum of an actuator phase characteristic at the drive frequency of the actuator $D_j$, a displacement sensor phase characteristic at the drive frequency of the actuator $D_j$, and −90 degrees.

With this configuration, the true first-order resonance frequency in the hemispherical resonator 2 can be highly precisely locked, and further, the phase characteristic of the actuator AC drive signals can be generated for realizing the efficient excitation of the first-order resonance mode for the hemispherical resonator 2.

Further, the nodal quadrature vibration control means 13 includes: electrical stiffness control means 40 configured to generate, based on the vibration amplitude of the nodal quadrature vibration output from the vibration mode shape extraction means 11, an electrical stiffness correction command to suppress the nodal quadrature vibration; and DC drive voltage distribution means 41 configured to set, depending on a sign of the electrical stiffness correction command output from the electrical stiffness control means 40, when the sign is a positive sign, orthogonal axis directions displaced in a phase by +22.5 degrees with respect to the azimuth orientation of wave antinode of the resonance mode, or when the sign is a negative sign, orthogonal axis directions displaced in a phase by −22.5 degrees with respect to the azimuth orientation of wave antinode of the resonance mode to electrical stiffness correction axes for the hemispherical resonator 2, and to distribute, to each one of the actuators $D_j$ arranged on both sides of the electrical stiffness correction axes, the DC drive signal for the each one of the actuators $D_j$ based on an absolute value of the electrical stiffness correction command.

With this configuration, the nodal quadrature vibration can be suppressed and the state in which only the first-order resonance mode is excited in the hemispherical resonator can be realized for the hemispherical resonator, and thus the drift of the output of the angle detected by the hemispherical resonator gyro can be suppressed.

Further, in this embodiment, the resonance control means 14 includes: resonance amplitude control means 50 configured to generate a resonance amplitude command for controlling the vibration amplitude of the resonance mode excited in the hemispherical resonator 2 to be the constant value; and AC drive voltage distribution means 51 configured to set the azimuth orientation of wave antinode of the resonance mode excited in the hemispherical resonator 2 as a resonance phase command, and distribute the AC drive signal for the each of the plurality of actuators $D_j$ based on the resonance amplitude command, the resonance phase command, and the cosine wave signal output from the reference signal generation means 10.

With this configuration, the actuator AC drive signals to realize the efficient excitation of the first-order resonance mode for the hemispherical resonator and the free rotation of the first-order resonance mode about the angle measurement axis can be generated.

Moreover, according to this embodiment, the AC drive voltage distribution means 51 of the resonance control means 14 is configured to distribute, based on the resonance amplitude command output from the resonance amplitude control means 50 and the cosine wave signal output from the reference signal generation means 10, the AC drive signal for the actuators $D_j$ for each one of the actuators $D_j$ arranged on the both sides of the orthogonal axes defined by the resonance phase command and orthogonal to the angle measurement axis 1.

With this configuration, regarding the desired first-order resonance mode excitation for the hemispherical resonator, the control calculation amount required for the generation of the actuator AC drive signals can be reduced.

Second Embodiment

In a hemispherical resonator gyro according to a second embodiment of the present invention, a cross sectional view taken along the plane including the angle measurement axis relating to the mechanical system configuration of the hemispherical resonator gyro, and a schematic diagram for illustrating the spatial arrangement of the hemispherical resonator, the actuators, and the displacement sensors on the plane perpendicular to the angle measurement axis are the same as FIG. 1 and FIG. 2.

Moreover, in the hemispherical resonator gyro according to the second embodiment of the present invention, a block diagram for illustrating the entire configuration, a block diagram for illustrating the internal configuration of the vibration mode shape extraction means 11, schematic diagrams for illustrating the overview of the positive direction rotational coordinate system 28 and the negative direction rotational coordinate system 29 applied in the vibration mode shape extraction means 11, a block diagram for illustrating the overview of the phase relationship from the actuator AC drive signals $f_{RESj}$ (j=1, 2, . . . , 16) to the resonance phase characteristic $\varphi_r$, a schematic chart for showing the frequency characteristic of the hemispherical resonator displacement with respect to the actuator AC drive signals $f_{RESj}$ (j=1, 2, . . . , 16), and a block diagram for illustrating the internal configuration of the drive frequency correction means 12 are the same as FIG. 3, FIG. 4, FIG. 5, FIG. 6, FIG. 7, and FIG. 8 according to the first embodiment.

Further, in the hemispherical resonator gyro according to the second embodiment of the present invention, a block diagram for illustrating the internal configuration of the nodal quadrature vibration control means 13, schematic diagrams for illustrating the overview of the operation in the nodal quadrature vibration control means 13, a block diagram for illustrating the internal configuration of the resonance control means 14, and a schematic diagram for illustrating the overview of the operation in the resonance control means 14 are the same as FIG. 9, FIG. 10, FIG. 11, and FIG. 12 according to the first embodiment.

Thus, in the second embodiment, referring to FIG. 1 to FIG. 12 of the first embodiment, a description of the same configurations is omitted, and in the following, a description is given of operations different from those of the first embodiment.

A description is now given of an operation of the hemispherical resonator gyro according to the second embodiment of the present invention.

In the drive frequency correction means 12 of the hemispherical resonator gyro according to the second embodiment of the present invention, regarding the phase characteristic 31 relating to the resonance phase characteristic $\varphi_r$, illustrated in FIG. 7, a resonance phase characteristic for a case in which the actuator drive frequency $\omega_r$ is set to be lower by a constant frequency set in advance with respect to the resonance frequency 32 of the hemispherical resonator is represented by Expression (28).

$$(\phi_r)_{max.} = \psi_D + \psi_S [\text{deg}] \tag{28}$$

A resonance phase characteristic for a case in which the actuator drive frequency $\omega_r$ is set to be higher by the constant frequency set in advance with respect to the resonance frequency 32 of the hemispherical resonator is represented by Expression (29).

$$(\phi_r)_{min.} = \psi_D + \psi_S - 180 [\text{deg}] \tag{29}$$

The resonance phase characteristic command $\varphi_r^*$ of FIG. 8 is defined as the average of the phase characteristic, and is set to Expression (30).

$$\phi_r^* = \frac{(\phi_r)_{max.} + (\phi_r)_{min.}}{2} \tag{30}$$

In general, the Q factor of the first-order resonance characteristic in the hemispherical resonator 2 is extremely high, the phase characteristic 31 drastically changes in a vicinity of the resonance frequency 32, and thus Expression (28) and Expression (29) can be acquired by changing the actuator drive frequency $\omega_r$ by approximately 1 Hz with respect to the resonance frequency 32. With this configuration, even when the actuator phase characteristic $\psi_D$ at the actuator drive frequency $\omega_r$ and the displacement sensor phase characteristic $\psi_S$ are unknown, the true first-order resonance frequency 32 in the hemispherical resonator 2 can highly precisely be locked by identifying the resonance phase characteristics given by Expression (28) and Expression (29).

Next, in the AC drive voltage distribution means 51 of the hemispherical resonator gyro according to the second embodiment of the present invention, as illustrated by thick arrows of FIG. 12, the actuator AC drive signals $f_{RESj}$ (j=1, 2, . . . , 16) are determined based on Expression (31) to Expression (38) so that the radial attraction forces $u_{RES}[\cos(\omega_r t)+1]$ and $u_{RES}[-\cos(\omega_r t)+1]$ opposite in the phase determined by the resonance amplitude command $u_{RES}$ and the cosine wave signal $\cos(\omega_r t)$ act on the hemispherical resonator 2 alternately at the interval of 90 degrees along the orthogonal axes defined by the resonance phase command $\chi$.

$$(i)\ 0 \le \chi [\text{deg}] < 22.5 \to f_{RESj} = \tag{31}$$

$$\begin{cases} \sqrt{u_{RES}[\pm\cos(\omega_r t) + 1](\cos(2\chi) - \sin(2\chi))/2\sqrt{2}} & (+: j = 8, 16,\ -: j = 4, 12) \\ \sqrt{u_{RES}[\pm\cos(\omega_r t) + 1]\cos(2\chi)/2} & (+: j = 1, 9,\ -: j = 5, 13) \\ \sqrt{u_{RES}[\pm\cos(\omega_r t) + 1](\cos(2\chi) + \sin(2\chi))/2\sqrt{2}} & (+: j = 2, 10,\ -: j = 6, 14) \\ \sqrt{u_{RES}[\pm\cos(\omega_r t) + 1]\sin(2\chi)/2} & (+: j = 3, 11,\ -: j = 7, 15) \end{cases}$$

$$(ii)\ 22.5 \le \chi [\text{deg}] < 45 \to f_{RESj} = \tag{32}$$

$$\begin{cases} \sqrt{u_{RES}[\pm\cos(\omega_r t) + 1]\cos(2\chi)/2} & (+: j = 1, 9,\ -: j = 5, 13) \\ \sqrt{u_{RES}[\pm\cos(\omega_r t) + 1](\cos(2\chi) + \sin(2\chi))/2\sqrt{2}} & (+: j = 2, 10,\ -: j = 6, 14) \\ \sqrt{u_{RES}[\pm\cos(\omega_r t) + 1]\sin(2\chi)/2} & (+: j = 3, 11,\ -: j = 7, 15) \\ \sqrt{u_{RES}[\pm\cos(\omega_r t) + 1](\sin(2\chi) - \cos(2\chi))/2\sqrt{2}} & (+: j = 4, 12,\ -: j = 8, 16) \end{cases}$$

(iii) $45 \leq \chi[\text{deg}] < 67.5 \rightarrow f_{RESj} =$ (33)

$$\begin{cases} \sqrt{u_{RES}[\pm\cos(\omega_r t)+1](\cos(2\chi)+\sin(2\chi))/2\sqrt{2}} & (+: j=2, 8, \quad -: j=6, 14) \\ \sqrt{u_{RES}[\pm\cos(\omega_r t)+1]\sin(2\chi)/2} & (+: j=3, 11, \quad -: j=7, 15) \\ \sqrt{u_{RES}[\pm\cos(\omega_r t)+1](\sin(2\chi)-\cos(2\chi))/2\sqrt{2}} & (+: j=4, 12, \quad -: j=8, 16) \\ \sqrt{-u_{RES}[\pm\cos(\omega_r t)+1]\cos(2\chi)/2} & (+: j=5, 13, \quad -: j=1, 9) \end{cases}$$

(iv) $67.5 \leq \chi[\text{deg}] < 90 \rightarrow f_{RESj} =$ (34)

$$\begin{cases} \sqrt{u_{RES}[\pm\cos(\omega_r t)+1]\sin(2\chi)/2} & (+: j=3, 11, \quad -: j=7, 15) \\ \sqrt{u_{RES}[\pm\cos(\omega_r t)+1](\sin(2\chi)-\cos(2\chi))/2\sqrt{2}} & (+: j=4, 12, \quad -: j=8, 16) \\ \sqrt{-u_{RES}[\pm\cos(\omega_r t)+1]\cos(2\chi)/2} & (+: j=5, 13, \quad -: j=1, 9) \\ \sqrt{-u_{RES}[\pm\cos(\omega_r t)+1](\sin(2\chi)+\cos(2\chi))/2\sqrt{2}} & (+: j=6, 14, \quad -: j=2, 10) \end{cases}$$

(v) $-22.5 \leq \chi[\text{deg}] < 0 \rightarrow f_{RESj} =$ (35)

$$\begin{cases} \sqrt{-u_{RES}[\pm\cos(\omega_r t)+1]\sin(2\chi)/2} & (+: j=7, 15, \quad -: j=3, 11) \\ \sqrt{u_{RES}[\pm\cos(\omega_r t)+1](\cos(2\chi)-\sin(2\chi))/2\sqrt{2}} & (+: j=8, 16, \quad -: j=4, 12) \\ \sqrt{u_{RES}[\pm\cos(\omega_r t)+1]\cos(2\chi)/2} & (+: j=1, 9, \quad -: j=5, 13) \\ \sqrt{u_{RES}[\pm\cos(\omega_r t)+1](\cos(2\chi)+\sin(2\chi))/2\sqrt{2}} & (+: j=2, 10, \quad -: j=6, 14) \end{cases}$$

(vi) $-45 \leq \chi[\text{deg}] < -22.5 \rightarrow f_{RESj} =$ (36)

$$\begin{cases} \sqrt{-u_{RES}[\pm\cos(\omega_r t)+1](\cos(2\chi)+\sin(2\chi))/2\sqrt{2}} & (+: j=6, 14, \quad -: j=2, 10) \\ \sqrt{-u_{RES}[\pm\cos(\omega_r t)+1]\sin(2\chi)/2} & (+: j=7, 15, \quad -: j=3, 11) \\ \sqrt{u_{RES}[\pm\cos(\omega_r t)+1](\cos(2\chi)-\sin(2\chi))/2\sqrt{2}} & (+: j=8, 16, \quad -: j=4, 12) \\ \sqrt{u_{RES}[\pm\cos(\omega_r t)+1]\cos(2\chi)/2} & (+: j=1, 9, \quad -: j=5, 13) \end{cases}$$

(vii) $-67.5 \leq \chi[\text{deg}] < -45 \rightarrow f_{RESj} =$ (37)

$$\begin{cases} \sqrt{-u_{RES}[\pm\cos(\omega_r t)+1]\cos(2\chi)/2} & (+: j=5, 13, \quad -: j=1, 9) \\ \sqrt{-u_{RES}[\pm\cos(\omega_r t)+1](\cos(2\chi)+\sin(2\chi))/2\sqrt{2}} & (+: j=6, 14, \quad -: j=2, 10) \\ \sqrt{-u_{RES}[\pm\cos(\omega_r t)+1]\sin(2\chi)/2} & (+: j=7, 15, \quad -: j=3, 11) \\ \sqrt{u_{RES}[\pm\cos(\omega_r t)+1](\cos(2\chi)-\sin(2\chi))/2\sqrt{2}} & (+: j=8, 16, \quad -: j=4, 12) \end{cases}$$

(viii) $-90 < \chi[\text{deg}] < -67.5 \rightarrow f_{RESj} =$ (38)

$$\begin{cases} \sqrt{u_{RES}[\pm\cos(\omega_r t)+1](\sin(2\chi)-\cos(2\chi))/2\sqrt{2}} & (+: j=4, 12, \quad -: j=8, 16) \\ \sqrt{-u_{RES}[\pm\cos(\omega_r t)+1]\cos(2\chi)/2} & (+: j=5, 13, \quad -: j=1, 9) \\ \sqrt{-u_{RES}[\pm\cos(\omega_r t)+1](\sin(2\chi)+\cos(2\chi))/2\sqrt{2}} & (+: j=2, 10, \quad -: j=6, 14) \\ \sqrt{-u_{RES}[\pm\cos(\omega_r t)+1]\sin(2\chi)/2} & (+: j=3, 11, \quad -: j=7, 15) \end{cases}$$

This corresponds to the realization of the radial attraction forces $u_{RES}[\cos(\omega_r t)+1]$ and $u_{RES}[-\cos(\omega_r t)+1]$ by using each two of the actuators arranged on the both sides of the orthogonal axes defined by the resonance phase command $\chi$ so that the norm of the generated attraction force in each of the actuators is minimum. Moreover, by setting the square root of a cosine attraction force command to the actuator AC drive signal $f_{RESj}$ (j=1, 2, . . . , 16), when an electrostatic actuator in which the generated attraction force is proportional to the square of the applied voltage is employed as the actuator, the attraction force generated by the actuator can be more precisely controlled.

In this way, by the hemispherical resonator gyro according to the second embodiment of the present invention, without using a related-art phase locked loop (PLL), the detailed vibration mode shapes of the first-order resonance mode and the nodal quadrature vibration excited in the hemispherical resonator 2 can be extracted, and thus the operation of the hemispherical resonator gyro can be always stabilized. Moreover, the operation extremely high in the spectral purity with respect to the first-order resonance frequency 32 of the hemispherical resonator 2 and the high phase resolution can be realized, and thus the angle detection resolution of the hemispherical resonator gyro can be increased.

Further, by the hemispherical resonator gyro according to the second embodiment of the present invention, even when the actuator phase characteristic $\psi_D$ at the actuator drive frequency $\omega_r$ and the displacement sensor phase characteristic $\psi_S$ are unknown, the true first-order resonance frequency 32 in the hemispherical resonator 2 can be highly precisely locked, and thus the phase characteristic of the actuator AC drive signals $f_{RESj}$ (j=1, 2, ..., 16) for realizing the efficient excitation of the first-order resonance mode for the hemispherical resonator 2 can be generated. Moreover, regarding the actuator AC drive signals $f_{RESj}$ (j=1, 2, ..., 16) for realizing the free rotation of the first-order resonance mode about the angle measurement axis 1, when an electrostatic actuator in which the generated attraction force is proportional to the square of the applied voltage is employed as the actuator, the applied voltage level of each of the actuator AC drive signals $f_{RESj}$ (j=1, 2, ..., 16) can be reduced, and the attraction force generated by the actuator can be more precisely controlled.

In addition, by the hemispherical resonator gyro according to the second embodiment of the present invention, the nodal quadrature vibration can be suppressed, the state in which only the first-order resonance mode is excited can be realized for the hemispherical resonator 2, and thus the drift of the rotational angle detected by the hemispherical resonator gyro can be suppressed.

Note that, in the hemispherical resonator gyro according to the second embodiment of the present invention, the total of 16 actuators and the total of 8 displacement sensors are applied, and the spatial arrangement thereof is set as the configuration of FIG. 2, but the present invention is not limited to this case. Regarding the actuators, the configuration only needs to realize the excitation of the first-order resonance mode for the hemispherical resonator 2 and the suppression of the nodal quadrature vibration, and, regarding the displacement sensors, in two sets of the orthogonal axis directions displaced from each other in the phase by 45 degrees, the configuration only needs to detect the radial displacements of the hemispherical resonator 2.

Moreover, in the hemispherical resonator gyro according to the second embodiment of the present invention, regarding the generation of the actuator AC drive signals $f_{RESj}$ (j=1, 2, ..., 16), the cosine wave signal $\cos(\omega_r t)$ at the actuator drive frequency $\omega_r$ is applied, but the present invention is not limited to this case. The sine wave signal $\sin(\omega_r t)$ may be applied by appropriately changing the corresponding expressions.

As described above, the second embodiment can provide the same effects as those of the first embodiment.

Further, according to this embodiment, the drive frequency correction means 12 is configured to control the drive frequency of the actuator $D_j$ so that the resonance phase characteristic for the AC drive signal for the actuator $D_j$ output from the vibration mode shape extraction means 11 is fixed to the average of the resonance phase characteristic in the case in which the drive frequency of the actuator $D_j$ is set to be lower by the frequency set in advance with respect to the resonance frequency of the hemispherical resonator 2 and the resonance phase characteristic in the case in which the drive frequency of the actuator $D_j$ is set to be higher by the frequency set in advance with respect to the resonance frequency of the hemispherical resonator 2.

With this configuration, even when the actuator phase characteristic at the actuator drive frequency and the displacement sensor phase characteristic are unknown, the true first-order resonance frequency in the hemispherical resonator can be highly precisely locked, and further, the phase characteristic of the actuator AC drive signals can be generated for realizing the efficient excitation of the first-order resonance mode for the hemispherical resonator.

Moreover, according to this embodiment, the AC drive voltage distribution means 51 of the resonance control means 14 is configured to calculate, based on the resonance amplitude command output from the resonance amplitude control means 50 and the cosine wave signal output from the reference signal generation means 10, the cosine wave attraction force command so that, for each two of the actuators $D_j$ arranged on the both sides of the orthogonal axes defined by the resonance phase command, the norm of the generated attraction force in the actuator $D_j$ is minimum, and distribute the square root of the cosine wave attraction force command as the AC drive signal for the actuator $D_j$.

With this configuration, when an electrostatic actuator in which the generated attraction force is proportional to the square of the applied voltage is employed as the actuator, regarding the desired first-order resonance mode excitation for the hemispherical resonator, the applied voltage level of each of the actuator AC drive signals can be reduced, and the attraction force generated by the actuator can be more precisely controlled.

Third Embodiment

In a hemispherical resonator gyro according to a third embodiment of the present invention, a cross sectional view taken along the plane including the angular velocity measurement axis relating to the mechanical system configuration of the hemispherical resonator gyro, and a schematic diagram for illustrating the spatial arrangement of the hemispherical resonator, the actuators, and the displacement sensors on the plane perpendicular to the angular velocity measurement axis are the same as FIG. 1 and FIG. 2.

Moreover, in the hemispherical resonator gyro according to the third embodiment of the present invention, a block diagram for illustrating the internal configuration of the vibration mode shape extraction means 11, schematic diagrams for illustrating the overview of the positive direction rotational coordinate system 28 and the negative direction rotational coordinate system 29 applied in the vibration mode shape extraction means 11, a block diagram for illustrating the overview of the phase relationship from the actuator AC drive signals $f_{RESj}$ (j=1, 2, ..., 16) to the resonance phase characteristic $\varphi_r$, a schematic chart for showing the frequency characteristic of the hemispherical resonator displacement with respect to the actuator AC drive signals $f_{RESj}$ (j=1, 2, ..., 16), and a block diagram for illustrating the internal configuration of the drive frequency correction means 12 are the same as FIG. 4, FIG. 5, FIG. 6, FIG. 7, and FIG. 8 according to the first embodiment.

Further, in the hemispherical resonator gyro according to the third embodiment of the present invention, a block diagram for illustrating the internal configuration of the nodal quadrature vibration control means 13, schematic diagrams for illustrating the overview of the operation in the nodal quadrature vibration control means 13, and a schematic diagram for illustrating the overview of the operation in the resonance control means 14 are the same as FIG. 9, FIG. 10, and FIG. 12 according to the first embodiment.

Thus, in the third embodiment, referring to FIG. 1, FIG. 2, FIG. 4 to FIG. 10, and FIG. 12 of the first embodiment, a description of the same configurations is omitted, and in the following, a description is given of configurations and operations different from those of the first embodiment.

A description is now given of the hemispherical resonator gyro according to the third embodiment of the present invention.

Figure 13:
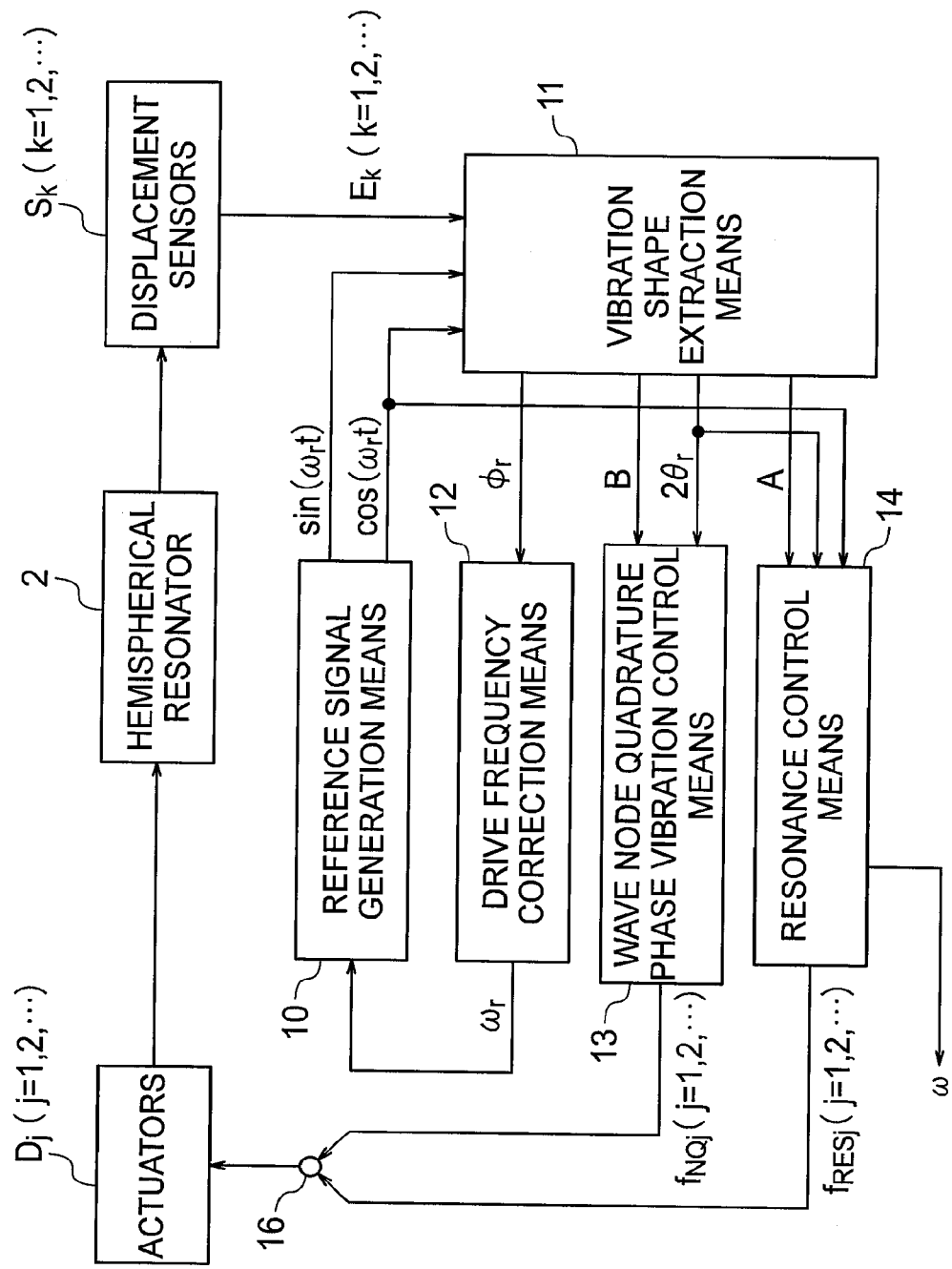
FIG. 13 is a block diagram for illustrating an entire configuration of the hemispherical resonator gyro according to the third and fourth embodiments of the present invention.

FIG. 13 is a block diagram for illustrating the overall configuration of the hemispherical resonator gyro according to the third embodiment of the present invention. A remarkable difference of the configuration of FIG. 13 from the configuration of FIG. 3 illustrated in the first embodiment resides in that, in FIG. 13, the angular scale factor multiplication means 15 is not provided. As illustrated in FIG. 13, the hemispherical resonator gyro according to the third embodiment includes the hemispherical resonator 2, the actuators $D_j$ (j=1, 2, ..., 16), the displacement sensors $S_k$ (k=1, 2, ..., 8), the reference signal generation means 10, the vibration mode shape extraction means 11, the drive frequency correction means 12, the nodal quadrature vibration control means 13, the resonance control means 14, and the actuator drive signal composition means 16.

As illustrated in FIG. 13, in the hemispherical resonator gyro according to the third embodiment, first, the reference signal generation means 10 generates the sine wave signal $\sin(\omega_r t)$ and the cosine wave signal $\cos(\omega_r t)$ corresponding to the actuator drive frequency $\omega_r$.

In the vibration mode shape extraction means 11, based on the sine wave signal $\sin(\omega_r t)$ and the cosine wave signal $\cos(\omega_r t)$ output from the reference signal generation means 10, and the displacement sensor outputs $E_k$ (k=1, 2, ..., 8) output from the plurality of displacement sensors $S_k$ (k=1, 2, ..., 8), the vibration amplitude A of the first-order resonance mode excited in the hemispherical resonator 2, the azimuth orientation $\theta_r$ of wave antinode, the resonance phase characteristic $\varphi_r$ corresponding to the actuator AC drive signals $f_{RESj}$ (j=1, 2, ..., 16) and the vibration amplitude B of the nodal quadrature vibration excited in the hemispherical resonator are extracted.

In the drive frequency correction means 12, based on the resonance phase characteristic $\varphi_r$ corresponding to the actuator AC drive signals $f_{RESj}$ (j=1, 2, ..., 16) output from the vibration mode shape extraction means 11, the actuator drive frequency $\omega_r$ is caused to match the resonance frequency of the hemispherical resonator 2.

In the nodal quadrature vibration control means 13, based on the vibration amplitude B of the nodal quadrature vibration and the azimuth orientation $\theta_r$ of wave antinode of the first-order resonance mode output from the vibration mode shape extraction means 11, the plurality of actuator DC drive signals $f_{NQj}$ (j=1, 2, ..., 16) for suppressing the nodal quadrature vibration are generated.

In the resonance control means 14, based on the first-order resonance mode vibration amplitude A and the azimuth orientation $\theta_r$ of wave antinode output from the vibration mode shape extraction means 11 and the cosine wave signal $\cos(\omega_r t)$ output from the reference signal generation means 10, the plurality of actuator AC drive signals $f_{RESj}$ (j=1, 2, ..., 16) for controlling both the vibration amplitude A and the azimuth orientation $\theta_r$ of wave antinode relating to the first-order resonance mode excited in the hemispherical resonator 2 to be constant shapes set in advance are generated.

In this way, the plurality of actuator DC drive signals $f_{NQj}$ (j=1, 2, ... 16) output from the nodal quadrature variation control means 13 and the plurality of actuator AC drive signals $f_{RESj}$ (j=1, 2, ..., 16) output from the resonance control means 14 are added to each other by the actuator drive signal composition means 16, and are output as the addition signals. Through control of the actuators $D_j$ (j=1, 2, ..., 16) based on the addition signals, the state in which only the first-order resonance mode is excited in the hemispherical resonator 2 by the actuator DC drive signals $f_{NQj}$ (j=1, 2, ..., 16) is realized, and further, the first-order resonance mode is controlled to be the constant shapes set in advance by the actuator AC drive signals $f_{RESj}$ (j=1, 2, 16).

On this occasion, in the resonance control means 14, the control command for maintaining the azimuth orientation $\theta_r$ of wave antinode to be a constant angle is proportional to the rotational angular velocity $\omega$ of the angular velocity measurement axis 1, and thus the rotational angular velocity $\omega$ in the angular velocity measurement axis 1 direction can be detected by multiplying the control command by an angular velocity scale factor set in advance.

Figure 14:
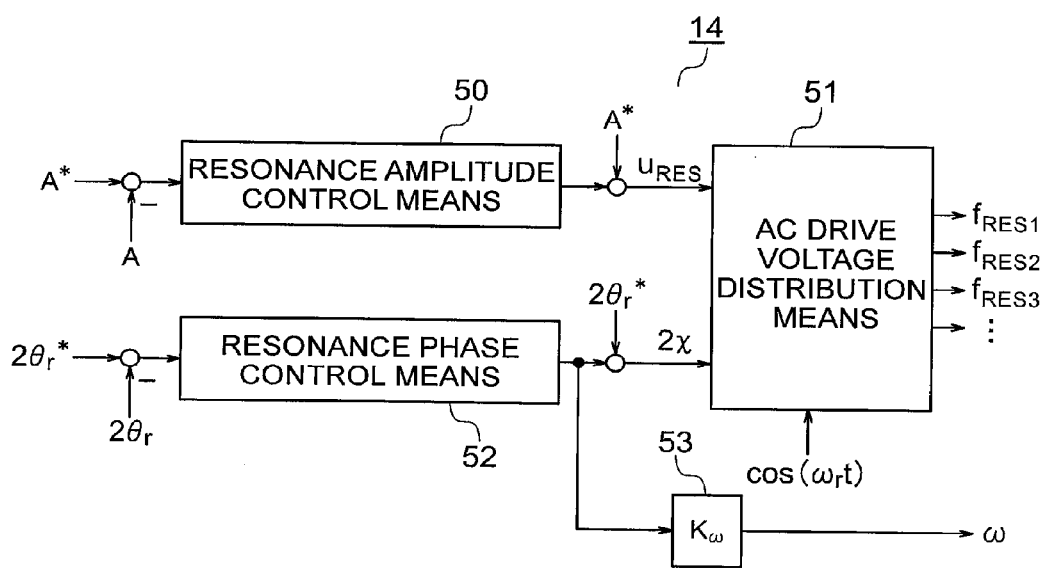
FIG. 14 is a block diagram for illustrating an internal configuration of the resonance control means according to the third and fourth embodiments of the present invention.

FIG. 14 is a block diagram for illustrating an internal configuration of the resonance control means 14 in the hemispherical resonator gyro according to the third embodiment of the present invention. As illustrated in FIG. 14, the resonance control means 14 of the hemispherical resonator gyro of the third embodiment includes the resonance amplitude control means 50, the AC drive voltage distribution means 51, resonance phase control means 52, and angular velocity scale factor multiplication means 53.

As illustrated in FIG. 14, in the resonance control means 14 of the hemispherical resonator gyro according to the third embodiment, a vibration amplitude deviation between the vibration amplitude A of the first-order resonance mode excited in the hemispherical resonator 2 output from the vibration mode shape extraction means 11 and the vibration amplitude command A* set to the constant value in advance is input to the resonance amplitude control means 50.

In the resonance amplitude control means 50, such a control command as to bring the vibration amplitude deviation to zero is calculated, and the sum of this control command and the vibration amplitude command A* is output as the resonance amplitude command $u_{RES}$ to the AC drive voltage distribution means 51.

On the other hand, an azimuth orientation of wave antinode deviation between the azimuth orientation $\theta_r$ of wave antinode of the first-order resonance mode excited in the hemispherical resonator 2 output from the vibration mode shape extraction means 11 and an azimuth orientation command $\theta_r^*$ of wave antinode set to a constant angle in advance is input to the resonance phase control means 52.

In the resonance phase control means 52, such a control command as to bring the azimuth orientation of wave antinode deviation to zero is calculated, and the sum of this control command and the azimuth orientation command $\theta_r^*$ of wave antinode is output as the resonance phase command $\chi$ to the AC drive voltage distribution means 51.

In the AC drive voltage distribution means 51, based on the resonance amplitude command $u_{RES}$, the resonance phase command $\chi$, and the cosine wave signal $\cos(\omega_r t)$ output from the reference signal generation means 10, the actuator AC drive signals $f_{RESj}$ (j=1, 2, ..., 16) are distributed to the actuators $D_j$ (j=1, 2, ..., 16). On this occasion, the control command output from the resonance phase control means 52 is proportional to the rotational angular velocity $\omega$ in the angular velocity measurement axis 1 direction, and thus the rotational angular velocity $\omega$ in the angular velocity measurement axis 1 direction can be detected by multiplying the control command by the angular velocity scale factor $K_\omega$ set in advance by the angular velocity scale factor multiplication means 53.

In particular, the AC drive voltage distribution means 51 according to the third embodiment of the present invention is configured, as illustrated by thick arrows of FIG. 12, to distribute the actuator AC drive signals $f_{RESj}$ (j=1, 2, ..., 16) to each two of actuators arranged on the both sides of the orthogonal axes so that the norms of the actuator AC drive signals $f_{RESj}$ (j=1, 2, ..., 16) are minimum, and the radial attraction forces $u_{RES}[\cos(\omega_r t)+1]$ and $u_{RES}[-\cos(\omega_r t)+1]$ opposite in the phase determined by the resonance amplitude command $u_{RES}$ and the cosine wave signal $\cos(\omega_r t)$ act on the hemispherical resonator 2 alternately at an interval of 90 degrees along the orthogonal axes defined by the resonance phase command $\chi$.

Next, a description is given of an operation of the hemispherical resonator gyro according to the third embodiment of the present invention.

In the hemispherical resonator gyro according to the third embodiment of the present invention, the axis of symmetry (Z axis) of the hemispherical resonator 2 illustrated in FIG. 1 serves as the angular velocity measurement axis 1.

As illustrated in FIG. 13, the radial displacement caused by the first-order resonance mode and the nodal quadrature vibration excited in the hemispherical resonator 2 are detected by the displacement sensors $S_k$ (k=1, 2, . . . , 8), and the displacement sensor outputs $E_k$ (k=1, 2, . . . , 8) on this occasion are given by Expression (2).

In FIG. 13, the configurations and the operations of the reference signal generation means 10, the vibration mode shape extraction means 11, and the nodal quadrature vibration control means 13 are the same as those of the hemispherical resonator gyro according to the first embodiment. The configurations and the operations of the drive frequency correction means 12 are the same as those of the hemispherical resonator gyro according to the second embodiment. Therefore, a description of those configurations is omitted.

In the resonance control means 14 illustrated in FIG. 13, based on the first-order resonance mode vibration amplitude A and the azimuth orientation $\theta_r$ of wave antinode output from the vibration mode shape extraction means 11 and the cosine wave signal $\cos(\omega_r t)$ output from the reference signal generation means 10, the plurality of actuator AC drive signals $f_{RESj}$ (j=1, 2, . . . , 16) for controlling both the vibration amplitude A and the azimuth orientation $\theta_r$ of wave antinode relating to the first-order resonance mode excited in the hemispherical resonator 2 to be constant shapes set in advance are generated.

Specifically, as illustrated in FIG. 14, first, from the vibration amplitude deviation between the vibration amplitude command A* set to the constant value in advance and the actual vibration amplitude A, such a control command as to bring the vibration amplitude deviation to zero is calculated by the resonance amplitude control means 50 constructed by a PI controller having a continuous system transfer function given by Expression (19), and a sum of this control command and the vibration amplitude command A* is set to the resonance amplitude command $u_{RES}$.

Moreover, from an azimuth orientation deviation of wave antinode between an azimuth orientation command $2\theta_r^*$ of wave antinode set to a constant angle in advance and the actual azimuth orientation $2\theta_r$ of wave antinode, such a control command as to bring the azimuth orientation deviation of wave antinode to zero is calculated by the resonance phase control means 52 constructed by a PI controller having a continuous system transfer function given by Expression (39) and a sum of this control command and the azimuth orientation command $2\theta_r^*$ of wave antinode is set to the resonance phase command $2\chi$.

$$K_{\theta P} + \frac{K_{\theta I}}{s} \tag{39}$$

Note that $K_{\theta P}$: proportional gain, and
$K_{\theta I}$: integration gain.

In the AC drive voltage distribution means 51, based on the resonance amplitude command $u_{RES}$, the resonance phase command $2\chi$, and the cosine wave signal $\cos(\omega_r t)$ output from the reference signal generation means 10, as illustrated by thick arrows of FIG. 12, the actuator AC drive signals $f_{RESj}$ (j=1, 2, . . . , 16) are determined based on Expression (40) to Expression (47) so that the radial attraction forces $u_{RES}[\cos(\omega_r t)+1]$ and $u_{RES}[-\cos(\omega_r t)+1]$ opposite in the phase determined by the resonance amplitude command $u_{RES}$ and the cosine wave signal $\cos(\omega_r t)$ act on the hemispherical resonator 2 alternately at the interval of 90 degrees along the orthogonal axis defined by the resonance phase command $\chi$.

(i) $0 \leq \chi[\deg] < 22.5 \rightarrow f_{RESj} =$ (40)

$$\begin{cases} u_{RES}[\pm\cos(\omega_r t) + 1](\cos(2\chi) - \sin(2\chi))/2\sqrt{2} & (+: j = 8, 16, \ -: j = 4, 12) \\ u_{RES}[\pm\cos(\omega_r t) + 1]\cos(2\chi)/2 & (+: j = 1, 9, \ -: j = 5, 13) \\ u_{RES}[\pm\cos(\omega_r t) + 1](\cos(2\chi) + \sin(2\chi))/2\sqrt{2} & (+: j = 2, 10, \ -: j = 6, 14) \\ u_{RES}[\pm\cos(\omega_r t) + 1]\sin(2\chi)/2 & (+: j = 3, 11, \ -: j = 7, 15) \end{cases}$$

(ii) $22.5 \leq \chi[\deg] < 45 \rightarrow f_{RESj} =$ (41)

$$\begin{cases} u_{RES}[\pm\cos(\omega_r t) + 1]\cos(2\chi)/2 & (+: j = 1, 9, \ -: j = 5, 13) \\ u_{RES}[\pm\cos(\omega_r t) + 1](\cos(2\chi) + \sin(2\chi))/2\sqrt{2} & (+: j = 2, 10, \ -: j = 6, 14) \\ u_{RES}[\pm\cos(\omega_r t) + 1]\sin(2\chi)/2 & (+: j = 3, 11, \ -: j = 7, 15) \\ u_{RES}[\pm\cos(\omega_r t) + 1](\sin(2\chi) - \cos(2\chi))/2\sqrt{2} & (+: j = 4, 12, \ -: j = 8, 16) \end{cases}$$

(iii) $45 \leq \chi[\deg] < 67.5 \rightarrow f_{RESj} =$ (42)

$$\begin{cases} u_{RES}[\pm\cos(\omega_r t) + 1](\cos(2\chi) + \sin(2\chi))/2\sqrt{2} & (+: j = 2, 8, \ -: j = 6, 14) \\ u_{RES}[\pm\cos(\omega_r t) + 1]\sin(2\chi)/2 & (+: j = 3, 11, \ -: j = 7, 15) \\ u_{RES}[\pm\cos(\omega_r t) + 1](\sin(2\chi) - \cos(2\chi))/2\sqrt{2} & (+: j = 4, 12, \ -: j = 8, 16) \\ -u_{RES}[\pm\cos(\omega_r t) + 1]\cos(2\chi)/2 & (+: j = 5, 13, \ -: j = 1, 9) \end{cases}$$

-continued (iv) $67.5 \leq \chi[\text{deg}] < 90 \to f_{RESj} =$ (43)

$$\begin{cases} u_{RES}[\pm\cos(\omega_r t)+1]\sin(2\chi)/2 & (+: j=3, 11, \quad -: j=7, 15) \\ u_{RES}[\pm\cos(\omega_r t)+1](\sin(2\chi)-\cos(2\chi))/2\sqrt{2} & (+: j=4, 12, \quad -: j=8, 16) \\ -u_{RES}[\pm\cos(\omega_r t)+1]\cos(2\chi)/2 & (+: j=5, 13, \quad -: j=1, 9) \\ -u_{RES}[\pm\cos(\omega_r t)+1](\sin(2\chi)+\cos(2\chi))/2\sqrt{2} & (+: j=6, 14, \quad -: j=2, 10) \end{cases}$$

(v) $-22.5 \leq \chi[\text{deg}] < 0 \to f_{RESj} =$ (44)

$$\begin{cases} -u_{RES}[\pm\cos(\omega_r t)+1]\sin(2\chi)/2 & (+: j=7, 15, \quad -: j=3, 11) \\ u_{RES}[\pm\cos(\omega_r t)+1](\cos(2\chi)-\sin(2\chi))/2\sqrt{2} & (+: j=8, 16, \quad -: j=4, 12) \\ u_{RES}[\pm\cos(\omega_r t)+1]\cos(2\chi)/2 & (+: j=1, 9, \quad -: j=5, 13) \\ u_{RES}[\pm\cos(\omega_r t)+1](\cos(2\chi)+\sin(2\chi))/2\sqrt{2} & (+: j=2, 10, \quad -: j=6, 14) \end{cases}$$

(vi) $-45 \leq \chi[\text{deg}] < -22.5 \to f_{RESj} =$ (45)

$$\begin{cases} -u_{RES}[\pm\cos(\omega_r t)+1](\cos(2\chi)+\sin(2\chi))/2\sqrt{2} & (+: j=6, 14, \quad -: j=2, 10) \\ -u_{RES}[\pm\cos(\omega_r t)+1]\sin(2\chi)/2 & (+: j=7, 15, \quad -: j=3, 11) \\ u_{RES}[\pm\cos(\omega_r t)+1](\cos(2\chi)-\sin(2\chi))/2\sqrt{2} & (+: j=8, 16, \quad -: j=4, 12) \\ u_{RES}[\pm\cos(\omega_r t)+1]\cos(2\chi)/2 & (+: j=1, 9, \quad -: j=5, 13) \end{cases}$$

(vii) $-67.5 \leq \chi[\text{deg}] < -45 \to f_{RESj} =$ (46)

$$\begin{cases} -u_{RES}[\pm\cos(\omega_r t)+1]\cos(2\chi)/2 & (+: j=5, 13, \quad -: j=1, 9) \\ -u_{RES}[\pm\cos(\omega_r t)+1](\cos(2\chi)+\sin(2\chi))/2\sqrt{2} & (+: j=6, 14, \quad -: j=2, 10) \\ -u_{RES}[\pm\cos(\omega_r t)+1]\sin(2\chi)/2 & (+: j=7, 15, \quad -: j=3, 11) \\ u_{RES}[\pm\cos(\omega_r t)+1](\cos(2\chi)-\sin(2\chi))/2\sqrt{2} & (+: j=8, 16, \quad -: j=4, 12) \end{cases}$$

(viii) $-90 < \chi[\text{deg}] < -67.5 \to f_{RESj} =$ (47)

$$\begin{cases} u_{RES}[\pm\cos(\omega_r t)+1](\sin(2\chi)-\cos(2\chi))/2\sqrt{2} & (+: j=4, 12, \quad -: j=8, 16) \\ -u_{RES}[\pm\cos(\omega_r t)+1]\cos(2\chi)/2 & (+: j=5, 13, \quad -: j=1, 9) \\ -u_{RES}[\pm\cos(\omega_r t)+1](\sin(2\chi)+\cos(2\chi))/2\sqrt{2} & (+: j=6, 14, \quad -: j=2, 10) \\ -u_{RES}[\pm\cos(\omega_r t)+1]\sin(2\chi)/2 & (+: j=7, 15, \quad -: j=3, 11) \end{cases}$$

This corresponds to the realization of the radial attraction forces $u_{RES}[\cos(\omega_r t)+1]$ and $u_{RES}[-\cos(\omega_r t)+1]$ through use of each two of actuators arranged on the both sides of the orthogonal axes defined by the resonance phase command $\chi$ so that the norm of the generated attraction force in each of the actuators is minimum, and the first-order resonance mode is controlled to be the constant shapes set in advance with this configuration.

The actuator DC drive signals $f_{NQj}$ (j=1, 2, ... 16) and the actuator AC drive signals $f_{RESj}$ (j=1, 2, ..., 16) illustrated in FIG. 13 are added to each other by the actuator drive signal composition means 16, and the actuators $D_j$ (j=1, 2, ..., 16) are controlled based on the added signals. On this occasion, the rotational angular velocity ω in the angular velocity measurement axis 1 direction is detected by multiplying the control command output from the resonance phase control means 52 by the angular velocity scale factor $K_\omega$ set in advance by the angular velocity scale factor multiplication means 53.

In this way, by the hemispherical resonator gyro according to the third embodiment of the present invention, without using a related-art phase locked loop (PLL), the detailed vibration mode shapes of the first-order resonance mode and the nodal quadrature vibration excited in the hemispherical resonator 2 can be extracted, and thus the operation of the hemispherical resonator gyro can be always stabilized. Moreover, the operation extremely high in the spectral purity with respect to the first-order resonance frequency 32 of the hemispherical resonator 2 and the high phase resolution can be realized, and thus the angular velocity detection resolution of the hemispherical resonator gyro can be increased.

Further, by the hemispherical resonator gyro according to the third embodiment of the present invention, even when the actuator phase characteristic $\psi_D$ at the actuator drive frequency $\omega_r$ and the displacement sensor phase characteristic $\psi_S$ are unknown, the true first-order resonance frequency 32 in the hemispherical resonator 2 can be highly precisely locked, and thus the phase characteristic of the actuator AC drive signals $f_{RESj}$ (j=1, 2, ..., 16) for realizing the efficient excitation of the first-order resonance mode for the hemispherical resonator 2 can be generated. Moreover, regarding the first-order resonance mode, for the actuator AC drive signals $f_{RESj}$ (j=1, 2, ..., 16) for controlling both the vibration amplitude A and the azimuth orientation $\theta_r$ of wave antinode to be the constant shapes (constant values and constant angles) set in advance, the applied voltage level for each of the actuators can be reduced.

In addition, by the hemispherical resonator gyro according to the third embodiment of the present invention, the nodal quadrature vibration can be suppressed, the state in which only the first-order resonance mode is excited can be realized for the hemispherical resonator 2, and thus the drift of the rotational angular velocity detected by the hemispherical resonator gyro can be suppressed.

Note that, in the hemispherical resonator gyro according to the third embodiment of the present invention, the total of 16 actuators and the total of 8 displacement sensors are applied, and the spatial arrangement thereof is set as the configuration of FIG. 2, but the present invention is not limited to this case. Regarding the actuators, the configuration only needs to realize the excitation of the first-order resonance mode for the hemispherical resonator 2 and the suppression of the nodal quadrature vibration, and, regarding the displacement sensors, in two sets of the orthogonal axis directions displaced from each other in the phase by 45 degrees, the configuration only needs to detect the radial displacements of the hemispherical resonator 2.

Moreover, in the hemispherical resonator gyro according to the third embodiment of the present invention, regarding the generation of the actuator AC drive signals $f_{RESj}$ (j=1, 2, ..., 16), the cosine wave signal $\cos(\omega_r t)$ at the actuator drive frequency $\omega_r$ is applied, but the present invention is not limited to this case. The sine wave signal $\sin(\omega_r t)$ may be applied by appropriately changing the corresponding expressions.

As described above, according to the third embodiment, there is provided a hemispherical resonator gyro, including: a hemispherical resonator 2 in an axisymmetric hemispherical shape with respect to an angular velocity measurement axis 1 serving as a measurement axis, configured to maintain an resonance pattern in a plane perpendicular to the angular velocity measurement axis; an upper housing 3 and a lower housing 4 configured to support the hemispherical resonator 2 via the angular velocity measurement axis 1; a plurality of actuators $D_j$ arranged on the upper housing 3 at an equal interval about the angular velocity measurement axis, each configured to generate an attraction force in a radial direction acting on the hemispherical resonator 2; a plurality of displacement sensors $S_k$ arranged on the lower housing 4 at an equal interval about the angular velocity measurement axis, each configured to detect a displacement in a radial direction of the hemispherical resonator 2; reference signal generation means 10 configured to generate a sine wave signal and a cosine wave signal corresponding to a drive frequency of the actuator $D_j$; vibration mode shape extraction means 11 configured to extract, based on the sine wave signal and the cosine wave signal output from the reference signal generation means 10, and the displacement in the radial direction of the hemispherical resonator 2 output from each of the plurality of the displacement sensors $S_k$, a vibration amplitude and an azimuth orientation of wave antinode azimuth of a resonance mode excited in the hemispherical resonator 2, a resonance phase characteristic with respect to an AC drive signal for the actuator $D_j$, and a vibration amplitude of a nodal quadrature vibration excited in the hemispherical resonator 2; drive frequency correction means 12 configured to cause, based on the resonance phase characteristic with respect to the AC drive signal for the actuator $D_j$ output from the vibration mode shape extraction means 11, the drive frequency of the actuator $D_j$ to match a resonance frequency of the hemispherical resonator 2; nodal quadrature vibration control means 13 configured to generate, based on the vibration amplitude of the nodal quadrature vibration and the azimuth orientation of the wave antinode of the resonance mode output from the vibration mode shape extraction means 11, a DC drive signal for each of the plurality of actuators $D_j$ to suppress the nodal quadrature vibration; and resonance control means 14 configured to generate, based on the vibration amplitude and the azimuth orientation of the wave antinode of the resonance mode output from the vibration mode shape extraction means 11 and the cosine wave signal output from the reference signal generation means 10, the AC drive signal for each of the plurality of actuators $D_j$ to control both the vibration amplitude and the azimuth orientation of wave antinode of the resonance mode excited in the hemispherical resonator 2 to be a constant value and a constant angle set in advance, in which a rotational angular velocity in the angular velocity measurement axis direction of the hemispherical resonator 2 is detected from a control command for maintaining the azimuth orientation of wave antinode in the resonance control means 14 to be the constant angle.

With this configuration, without using the related-art phase locked loop (PLL), the detailed vibration mode shapes of the first-order resonance mode and the nodal quadrature vibration excited in the hemispherical resonator can be extracted, and thus the operation of the hemispherical resonator gyro can be always stabilized, and the operation extremely high in the spectral purity with respect to the first-order resonance frequency and the highly precise lock of the hemispherical resonator gyro can be enabled.

Moreover, with the vibration mode shape extraction based on this configuration, the high phase resolution can be realized for the first-order resonance frequency of the hemispherical resonator, and the angular velocity detection resolution of the hemispherical resonator gyro can be increased.

Further, with this configuration, the true first-order resonance frequency in the hemispherical resonator can be highly precisely locked, and thus the phase characteristic of the actuator AC drive signals can be generated to realize the efficient excitation of the first-order resonance mode for the hemispherical resonator.

Moreover, according to this embodiment, the resonance control means 14 includes the resonance amplitude control means 50 configured to generate the resonance amplitude command for controlling the vibration amplitude of the resonance mode excited in the hemispherical resonator 2 to be the constant value, the resonance phase control means 52 configured to generate the resonance phase command for controlling the azimuth orientation of wave antinode of the resonance mode excited in the hemispherical resonator 2 to be the constant angle, and the AC drive voltage distribution means 51 configured to distribute, based on the resonance amplitude command, the resonance phase command, and the cosine wave signal output from the reference signal generation means 10, the AC drive signals for the plurality of actuators $D_j$.

With this configuration, the actuator AC drive signals for efficiently exciting the first-order resonance mode for the hemispherical resonator, and controlling, regarding the first-order resonance mode, both the vibration amplitude and the azimuth orientation of wave antinode to be the constant shapes can be generated.

Moreover, according to this embodiment, the AC drive voltage distribution means 51 of the resonance control means 14 is configured to distribute, based on the resonance amplitude command output from the resonance amplitude control means 50 and the cosine wave signal output from the reference signal generation means 10, the AC drive signal for the actuators $D_j$ for each two of the actuators $D_j$ arranged on the both sides of the orthogonal axes defined by the resonance phase command and orthogonal to the angle measurement axis 1 so that the norms of the drive voltages of the actuators $D_j$ are minimum.

With this configuration, regarding the desired first-order resonance mode excitation with respect to the hemispherical resonator, the applied voltage level of the AC drive signal for each of the actuator can be reduced.

Moreover, it should be understood that the same configurations as those of the first and second embodiments can provide the effects described in the first embodiment and the second embodiment.

Fourth Embodiment

In a hemispherical resonator gyro according to a fourth embodiment of the present invention, a cross sectional view taken along the plane including the angular velocity measurement axis relating to the mechanical system configuration of the hemispherical resonator gyro, and a schematic diagram for illustrating the spatial arrangement of the hemispherical resonator, the actuators, and the displacement sensors on the plane perpendicular to the angular velocity measurement axis are the same as FIG. 1 and FIG. 2.

Moreover, in the hemispherical resonator gyro according to the fourth embodiment of the present invention, a block diagram for illustrating the entire configuration is the same as FIG. 13 of the third embodiment, and a block diagram for illustrating the internal configuration of the vibration mode shape extraction means 11, schematic diagrams for illustrating the overview of the positive direction rotational coordinate system 28 and the negative direction rotational coordinate system 29 applied in the vibration mode shape extraction means 11, a block diagram for illustrating the overview of the phase relationship from the actuator AC drive signals $f_{RESj}$ (j=1, 2, . . . , 16) to the resonance phase characteristic $\varphi_r$, a schematic chart for showing the frequency characteristic of the hemispherical resonator displacement with respect to the actuator AC drive signals $f_{RESj}$ (j=1, 2, . . . , 16) and a block diagram for illustrating the internal configuration of the drive frequency correction means 12 are the same as FIG. 4, FIG. 5, FIG. 6, FIG. 7, and FIG. 8 according to the first embodiment.

Further, in the hemispherical resonator gyro according to the fourth embodiment of the present invention, a block diagram for illustrating the internal configuration of the nodal quadrature vibration control means 13, schematic diagrams for illustrating the overview of the operation in the nodal quadrature vibration control means 13, a schematic diagram for illustrating the overview of the operation in the resonance control means 14 are the same as FIG. 9, FIG. 10, and FIG. 12 according to the first embodiment, and a block diagram for illustrating the internal configuration of the resonance control means 14 is the same as FIG. 14 according to the third embodiment.

Thus, in the fourth embodiment, referring to FIG. 1, FIG. 2, FIG. 4 to FIG. 10, and FIG. 12 of the first embodiment and FIG. 14 of the third embodiment, a description of the same configurations is omitted, and in the following, a description is given of operations different from those of the first embodiment and the third embodiment.

A description is now given of an operation of the hemispherical resonator gyro according to the fourth embodiment of the present invention.

In the hemispherical resonator gyro according to the fourth embodiment of the present invention, the axis of symmetry (Z axis) of the hemispherical resonator 2 illustrated in FIG. 1 serves as the angular velocity measurement axis 1.

In FIG. 13, the configurations and the operations of the reference signal generation means 10, the vibration mode shape extraction means 11, the drive frequency correction means 12, and the nodal quadrature vibration control means 13 are the same as those of the hemispherical resonator gyro according to the first embodiment. The configurations of the resonance control means 14 are the same as those of the hemispherical resonator gyro according to the third embodiment.

In the AC drive voltage distribution means 51 according to the fourth embodiment of the present invention, as illustrated by thick arrows of FIG. 12, the actuator AC drive signals $f_{RESj}$ (j=1, 2, . . . , 16) are determined based on Expression (48) to Expression (55) so that the radial attraction forces $u_{RES}[\cos(\omega_r t)+1]$ and $u_{RES}[-\cos(\omega_r t)+1]$ opposite in the phase determined by the resonance amplitude command $u_{RES}$ and the cosine wave signal $\cos(\omega_r t)$ act on the hemispherical resonator 2 alternately at the interval of 90 degrees along the orthogonal axes defined by the resonance phase command $\chi$.

$$(i)\ 0 \le \chi[\deg] < 22.5 \to f_{RESj} = \begin{cases} \sqrt{u_{RES}[\pm\cos(\omega_r t)+1](\cos(2\chi)-\sin(2\chi))} & (+: j=1, 9,\ -: j=5, 13) \\ \sqrt{\sqrt{2}\,u_{RES}[\pm\cos(\omega_r t)+1]\sin(2\chi)} & (+: j=2, 10,\ -: j=6, 14) \\ 0 & (\text{otherwise}) \end{cases} \quad (48)$$

$$(ii)\ 22.5 \le \chi[\deg] < 45 \to f_{RESj} = \begin{cases} \sqrt{\sqrt{2}\,u_{RES}[\pm\cos(\omega_r t)+1]\cos(2\chi)} & (+: j=2, 10,\ -: j=6, 14) \\ \sqrt{u_{RES}[\pm\cos(\omega_r t)+1](\sin(2\chi)-\cos(2\chi))} & (+: j=3, 11,\ -: j=7, 15) \\ 0 & (\text{otherwise}) \end{cases} \quad (49)$$

$$(iii)\ 45 \le \chi[\deg] < 67.5 \to f_{RESj} = \begin{cases} \sqrt{u_{RES}[\pm\cos(\omega_r t)+1](\sin(2\chi)+\cos(2\chi))} & (+: j=3, 11,\ -: j=7, 15) \\ \sqrt{-\sqrt{2}\,u_{RES}[\pm\cos(\omega_r t)+1]\cos(2\chi)} & (+: j=4, 12,\ -: j=8, 16) \\ 0 & (\text{otherwise}) \end{cases} \quad (50)$$

$$(iv)\ 67.5 \le \chi[\deg] < 90 \to f_{RESj} = \begin{cases} \sqrt{\sqrt{2}\,u_{RES}[\pm\cos(\omega_r t)+1]\sin(2\chi)} & (+: j=4, 12,\ -: j=8, 16) \\ \sqrt{-u_{RES}[\pm\cos(\omega_r t)+1](\sin(2\chi)+\cos(2\chi))} & (+: j=5, 13,\ -: j=1, 9) \\ 0 & (\text{otherwise}) \end{cases} \quad (51)$$

-continued (v) $-22.5 \leq \chi[\deg] < 0 \to f_{RESj} =$ (52)

$$\begin{cases} \sqrt{u_{RES}[\pm\cos(\omega_r t)+1](\sin(2\chi)+\cos(2\chi))} & (+: j=1, 9, \quad -: j=5, 13) \\ \sqrt{-\sqrt{2}\, u_{RES}[\pm\cos(\omega_r t)+1]\sin(2\chi)} & (+: j=8, 16, \quad -: j=4, 12) \\ 0 & (\text{otherwise}) \end{cases}$$

(vi) $-45 \leq \chi[\deg] < -22.5 \to f_{RESj} =$ (53)

$$\begin{cases} \sqrt{-u_{RES}[\pm\cos(\omega_r t)+1](\sin(2\chi)+\cos(2\chi))} & (+: j=7, 15, \quad -: j=3, 11) \\ \sqrt{\sqrt{2}\, u_{RES}[\pm\cos(\omega_r t)+1]\cos(2\chi)} & (+: j=8, 16, \quad -: j=4, 12) \\ 0 & (\text{otherwise}) \end{cases}$$

(vii) $-67.5 \leq \chi[\deg] < -45 \to f_{RESj} =$ (54)

$$\begin{cases} \sqrt{-\sqrt{2}\, u_{RES}[\pm\cos(\omega_r t)+1]\cos(2\chi)} & (+: j=6, 14, \quad -: j=2, 10) \\ \sqrt{u_{RES}[\pm\cos(\omega_r t)+1](\cos(2\chi)-\sin(2\chi))} & (+: j=7, 15, \quad -: j=3, 11) \\ 0 & (\text{otherwise}) \end{cases}$$

(viii) $-90 < \chi[\deg] < -67.5 \to f_{RESj} =$ (55)

$$\begin{cases} \sqrt{u_{RES}[\pm\cos(\omega_r t)+1](\sin(2\chi)-\cos(2\chi))} & (+: j=5, 13, \quad -: j=1, 9) \\ \sqrt{-\sqrt{2}\, u_{RES}[\pm\cos(\omega_r t)+1]\sin(2\chi)} & (+: j=6, 14, \quad -: j=2, 10) \\ 0 & (\text{otherwise}) \end{cases}$$

This corresponds to the realization of the radial attraction forces $u_{RES}[\cos(\omega_r t)+1]$ and $u_{RES}[-\cos(\omega_r t)+1]$ by using each one of actuators arranged on the both sides of the orthogonal axes defined by the resonance phase command $\chi$. Moreover, by setting the square root of the cosine attraction force command to the actuator AC drive signals $f_{RESj}$ (j=1, 2, . . . , 16), when an electrostatic actuator in which the generated attraction force is proportional to the square of the applied voltage is employed as the actuator, the attraction force generated by the actuator can be more precisely controlled.

In this way, by the hemispherical resonator gyro according to the fourth embodiment of the present invention, without using a related-art phase locked loop (PLL), the detailed vibration mode shapes of the first-order resonance mode and the nodal quadrature vibration excited in the hemispherical resonator 2 can be extracted, and the operation of the hemispherical resonator gyro can thus be always stabilized. Moreover, the operation extremely high in the spectral purity and the high phase resolution with respect to the first-order resonance frequency 32 of the hemispherical resonator 2 can be realized, and thus the angular velocity detection resolution of the hemispherical resonator gyro can be increased.

Further, by the hemispherical resonator gyro according to the fourth embodiment of the present invention, the true first-order resonance frequency 32 in the hemispherical resonator 2 can be highly precisely locked, and thus the phase characteristic of the actuator AC drive signals $f_{RESj}$ (j=1, 2, . . . , 16) for realizing the efficient excitation of the first-order resonance mode for the hemispherical resonator 2 can be generated. Moreover, regarding the first-order resonance mode, for the actuator AC drive signals $f_{RESj}$ (j=1, 2, . . . , 16) for controlling both the vibration amplitude A and the azimuth orientation $\theta_r$ of wave antinode relating to the first-order resonance mode to be the constant shapes (constant values and constant angles) set in advance, when an electrostatic actuator in which the generated attraction force is proportional to the square of the applied voltage is employed as the actuator, the control calculation amount required for the generation of the actuator AC drive signals $f_{RESj}$ (j=1, 2, . . . , 16) can be reduced, and the attraction force generated by the actuator can be more precisely controlled.

In addition, by the hemispherical resonator gyro according to the fourth embodiment of the present invention, the nodal quadrature vibration can be suppressed, the state in which only the first-order resonance mode is excited can be realized for the hemispherical resonator 2, and thus the drift of the rotational angular velocity detected by the hemispherical resonator gyro can be suppressed.

Note that, in the hemispherical resonator gyro according to the fourth embodiment of the present invention, the total of 16 actuators and the total of 8 displacement sensors are applied, and the spatial arrangement thereof is set as the configuration of FIG. 2, but the present invention is not limited to this case. Regarding the actuators, the configuration only needs to realize the excitation of the first-order resonance mode for the hemispherical resonator 2 and the suppression of the nodal quadrature vibration, and, regarding the displacement sensors, in two sets of the orthogonal axis directions displaced from each other in the phase by 45 degrees, the configuration only needs to detect the radial displacements of the hemispherical resonator 2.

Moreover, in the hemispherical resonator gyro according to the fourth embodiment of the present invention, regarding the generation of the actuator AC drive signals $f_{RESj}$ (j=1, 2, . . . , 16), the cosine wave signal $\cos(\omega_r t)$ at the actuator drive frequency $\omega_r$ is applied, but the present invention is not limited to this case. The sine wave signal $\sin(\omega_r t)$ may be applied by appropriately changing the corresponding expressions.

As described above, the fourth embodiment can provide the same effects as those of the third embodiment.

Moreover, according to this embodiment, the AC drive voltage distribution means 51 of the resonance control means 14 is configured to distribute, for each one of the actuators $D_j$ arranged on the both sides of the orthogonal axes defined by the resonance phase command, the square root of the cosine wave attraction force command based on the resonance amplitude command output from the resonance amplitude control means 50 and the cosine wave signal output from the reference signal generation means 10 as the AC drive signal for the actuator $D_j$.

With this configuration, when an electrostatic actuator in which the generated attraction force is proportional to the square of the applied voltage is employed as the actuator, regarding the desired first-order resonance mode excitation for the hemispherical resonator, the control calculation amount required for the generation of the actuator AC drive signals can be reduced, and the attraction force generated by the actuator can be more precisely controlled.

Moreover, it should be understood that the same configurations as those of the first and second embodiments can provide the same effects as those described in the first embodiment and the second embodiment.

The invention claimed is:

1. A hemispherical resonator gyro, comprising:
   a hemispherical resonator in an axisymmetric hemispherical shape with respect to an angle measurement axis serving as a measurement axis, configured to maintain an resonance pattern in a plane perpendicular to the angle measurement axis;
   a plurality of actuators arranged about the angle measurement axis, each actuator configured to generate an attraction force in a radial direction acting on the hemispherical resonator;
   a plurality of displacement sensors arranged about the angle measurement axis, each displacement sensor configured to detect a displacement in the radial direction of the hemispherical resonator;
   vibration mode shape extraction means configured to acquire, based on the displacement in the radial direction of the hemispherical resonator output from each of the plurality of displacement sensors, a predetermined low-frequency component from a translation of a complex representation acquired by setting outputs of the plurality of displacement sensors arranged at positions displaced by 45 degrees from each other about the measurement axis as a real part and an imaginary part into a representation in a rotational coordinate system rotating at a rotational speed matching a drive frequency of the actuator, and to extract, from the predetermined low-frequency component, a vibration amplitude and an azimuth orientation of a wave antinode of a resonance mode excited in the hemispherical resonator, a resonance phase characteristic with respect to an AC drive signal for the actuator, and a vibration amplitude of a nodal quadrature vibration excited in the hemispherical resonator;
   drive frequency correction means configured to cause, based on the resonance phase characteristic with respect to the AC drive signal for the actuator output from the vibration mode shape extraction means, the drive frequency of the actuator to match a resonance frequency of the hemispherical resonator;
   nodal quadrature vibration control means configured to generate, based on the vibration amplitude of the nodal quadrature vibration and the azimuth orientation of the wave antinode of the resonance mode output from the vibration mode shape extraction means, a DC drive signal for the each of the plurality of actuators to suppress the nodal quadrature vibration; and
   resonance control means configured to generate, based on the vibration amplitude and the azimuth orientation of the wave antinode of the resonance mode output from the vibration mode shape extraction means, the AC drive signal for the each of the plurality of actuators to control the vibration amplitude of the resonance mode excited in the hemispherical resonator to be a constant value set in advance, and to realize a free rotation of the resonance mode about the angle measurement axis,
   wherein a rotational angle in the angle measurement axis of the hemispherical resonator is detected from the azimuth orientation of the wave antinode of the resonance mode excited in the hemispherical resonator.

2. The hemispherical resonator gyro according to claim 1, further comprising reference signal generation means configured to generate a sine wave signal and a cosine wave signal corresponding to a drive frequency of the actuator, wherein the vibration mode shape extraction means comprises:
   first composition means configured to compose outputs of the displacement sensors arranged in first orthogonal axis directions orthogonal to the measurement axis;
   second composition means configured to compose outputs of the displacement sensors arranged in second orthogonal axis directions orthogonal to the measurement axis, and displaced in a phase by 45 degrees about the measurement axis with respect to the first orthogonal axes directions;
   positive direction rotational coordinate translation means configured to translate a complex representation including an output from the first composition means as a real part and an output from the second composition means as an imaginary part into a representation in a rotational coordinate system rotating in a positive direction at a rotational speed matching the drive frequency of the actuator;
   negative direction rotational coordinate translation means configured to translate the complex representation including the output from the first composition means as the real part and the output from the second composition means as the imaginary part into a representation in a rotational coordinate system rotating in a negative direction at the rotational speed matching the drive frequency of the actuator;
   positive direction low-frequency extraction means configured to extract a low-frequency component set in advance from an output of the positive direction rotational coordinate translation means;
   negative direction low-frequency extraction means configured to extract a low-frequency component set in advance from an output of the negative direction rotational coordinate translation means;
   phase characteristic extraction means configured to calculate, based on outputs of the positive direction low-frequency extraction means and the negative direction low-frequency extraction means, the resonance phase characteristic with respect to the AC drive signal for the actuator of the resonance mode excited in the hemispherical resonator; and
   vibration characteristic extraction means configured to extract, based on outputs of the positive direction low-frequency extraction means and the negative direction low-frequency extraction means and an output of the phase characteristic extraction means, the vibration amplitude and the azimuth orientation of the wave antinode of the resonance mode excited in the hemispherical resonator and the vibration amplitude of the nodal quadrature vibration excited in the hemispherical resonator.

3. The hemispherical resonator gyro according to claim 1, wherein the drive frequency correction means is configured to control the drive frequency of the actuator so that the resonance phase characteristic with respect to the AC drive signal for the actuator output from the vibration mode shape extraction means is fixed to a sum of an actuator phase characteristic at the drive frequency of the actuator, a displacement sensor phase characteristic at the drive frequency of the actuator, and −90 degrees.

4. The hemispherical resonator gyro according to claim 1, wherein the drive frequency correction means is configured to control the drive frequency of the actuator so that the resonance phase characteristic with respect to the AC drive signal for the actuator output from the vibration mode shape extraction means is fixed to an average of a resonance phase characteristic in a case in which the drive frequency of the actuator is set to be lower by a frequency set in advance with respect to the resonance frequency of the hemispherical resonator and a resonance phase characteristic in a case in which the drive frequency of the actuator is set to be higher by the frequency set in advance with respect to the resonance frequency of the hemispherical resonator.

5. The hemispherical resonator gyro according to claim 1, wherein the nodal quadrature vibration control means comprises:
electrical stiffness control means configured to generate, based on the vibration amplitude of the nodal quadrature vibration output from the vibration mode shape extraction means, an electrical stiffness correction command to suppress the nodal quadrature vibration; and
DC drive voltage distribution means configured to set, depending on a sign of the electrical stiffness correction command output from the electrical stiffness control means, when the sign is a positive sign, orthogonal axis directions displaced in a phase by +22.5 degrees with respect to the azimuth orientation of the wave antinode of the resonance mode, or when the sign is a negative sign, orthogonal axis directions displaced in a phase by −22.5 degrees with respect to the azimuth orientation of the wave antinode of the resonance mode to electrical stiffness correction axes for the hemispherical resonator, and to distribute, to each one of the actuators arranged on both sides of the electrical stiffness correction axes, the DC drive signal for the actuator based on an absolute value of the electrical stiffness correction command.

6. The hemispherical resonator gyro according to claim 2, wherein the resonance control means comprises:
resonance amplitude control means configured to generate a resonance amplitude command to control the vibration amplitude of the resonance mode excited in the hemispherical resonator to be the constant value; and
AC drive voltage distribution means configured to set the azimuth orientation of the wave antinode of the resonance mode excited in the hemispherical resonator as a resonance phase command, and distribute the AC drive signal for the each of the plurality of actuators based on the resonance amplitude command, the resonance phase command, and the cosine wave signal output from the reference signal generation means.

7. The hemispherical resonator gyro according to claim 6, wherein the AC drive voltage distribution means of the resonance control means is configured to distribute, to each one of the actuators arranged on both sides of orthogonal axes defined by the resonance phase command and orthogonal to the measurement axis, the AC drive signal for the actuator based on the resonance amplitude command output from the resonance amplitude control means and the cosine wave signal output from the reference signal generation means.

8. The hemispherical resonator gyro according to claim 6, wherein the AC drive voltage distribution means of the resonance control means is configured to distribute, to each two of the actuators arranged on both sides of orthogonal axes defined by the resonance phase command and orthogonal to the measurement axis, the AC drive signal for the actuator based on the resonance amplitude command output from the resonance amplitude control means and the cosine wave signal output from the reference signal generation means so that a norm of a drive voltage of the actuator is minimum.

9. The hemispherical resonator gyro according to claim 6, wherein the AC drive voltage distribution means of the resonance control means is configured to distribute, to each one of the actuators arranged on both sides of orthogonal axes defined by the resonance phase command and orthogonal to the measurement axis, a square root of a cosine wave attraction force command based on the resonance amplitude command output from the resonance amplitude control means and the cosine wave signal output from the reference signal generation means, as the AC drive signal for the actuator.

10. The hemispherical resonator gyro according to claim 6, wherein the AC drive voltage distribution means of the resonance control means is configured to calculate, to each two of the actuators arranged on both sides of orthogonal axes defined by the resonance phase command and orthogonal to the measurement axis, a cosine wave attraction force command so that a norm of a generated attraction force of the actuator is minimum based on the resonance amplitude command output from the resonance amplitude control means and the cosine wave signal output from the reference signal generation means, and to distribute a square root of the cosine wave attraction force command as the AC drive signal for the actuator.

11. A hemispherical resonator gyro, comprising:
a hemispherical resonator in an axisymmetric hemispherical shape with respect to an angular velocity measurement axis serving as a measurement axis, configured to maintain an resonance pattern in a plane perpendicular to the angular velocity measurement axis;
a plurality of actuators arranged about the angular velocity measurement axis, each actuator configured to generate an attraction force in a radial direction acting on the hemispherical resonator;
a plurality of displacement sensors arranged about the angular velocity measurement axis, each displacement sensor configured to detect a displacement in the radial direction of the hemispherical resonator;
vibration mode shape extraction means configured to acquire, based on the displacement in the radial direction of the hemispherical resonator output from each of the plurality of displacement sensors, a predetermined low-frequency component from a translation of a complex representation acquired by setting outputs of the plurality of displacement sensors arranged at positions displaced by 45 degrees from each other about the measurement axis as a real part and an imaginary part into a representation in a rotational coordinate system rotating at a rotational speed matching a drive frequency of the actuator, and to extract, from the predetermined low-frequency component, a vibration amplitude and an azimuth orientation of a wave antinode of a resonance mode excited in the hemispherical resonator, a resonance phase characteristic with respect to an AC drive signal for the actuator, and a vibration amplitude of a nodal quadrature vibration excited in the hemispherical resonator;

drive frequency correction means configured to cause, based on the resonance phase characteristic with respect to the AC drive signal for the actuator output from the vibration mode shape extraction means, the drive frequency of the actuator to match a resonance frequency of the hemispherical resonator;

nodal quadrature vibration control means configured to generate, based on the vibration amplitude of the nodal quadrature vibration and the azimuth orientation of the wave antinode of the resonance mode output from the vibration mode shape extraction means, a DC drive signal for the each of the plurality of actuators to suppress the nodal quadrature vibration; and resonance control means configured to generate, based on the vibration amplitude and the azimuth orientation of the wave antinode of the resonance mode output from the vibration mode shape extraction means, the AC drive signal for the each of the plurality of actuators to control both the vibration amplitude and the azimuth orientation of the wave antinode of the resonance mode excited in the hemispherical resonator to be a constant value and a constant angle set in advance, wherein a rotational angular velocity in the angular velocity measurement axis of the hemispherical resonator is detected from a control command for maintaining the azimuth orientation of the wave antinode in the resonance control means to be the constant angle.

12. The hemispherical resonator gyro according to claim 11, further comprising reference signal generation means configured to generate a sine wave signal and a cosine wave signal corresponding to a drive frequency of the actuator, wherein the vibration mode shape extraction means comprises:

first composition means configured to compose outputs of the displacement sensors arranged in first orthogonal axis directions orthogonal to the measurement axis;

second composition means configured to compose outputs of the displacement sensors arranged in second orthogonal axis directions orthogonal to the measurement axis, and displaced in a phase by 45 degrees about the measurement axis with respect to the first orthogonal axes directions;

positive direction rotational coordinate translation means configured to translate a complex representation including an output from the first composition means as a real part and an output from the second composition means as an imaginary part into a representation in a rotational coordinate system rotating in a positive direction at a rotational speed matching the drive frequency of the actuator;

negative direction rotational coordinate translation means configured to translate the complex representation including the output from the first composition means as the real part and the output from the second composition means as the imaginary part into a representation in a rotational coordinate system rotating in a negative direction at the rotational speed matching the drive frequency of the actuator;

positive direction low-frequency extraction means configured to extract a low-frequency component set in advance from an output of the positive direction rotational coordinate translation means;

negative direction low-frequency extraction means configured to extract a low-frequency component set in advance from an output of the negative direction rotational coordinate translation means;

phase characteristic extraction means configured to calculate, based on outputs of the positive direction low-frequency extraction means and the negative direction low-frequency extraction means, the resonance phase characteristic with respect to the AC drive signal for the actuator of the resonance mode excited in the hemispherical resonator; and vibration characteristic extraction means configured to extract, based on outputs of the positive direction low-frequency extraction means and the negative direction low-frequency extraction means and an output of the phase characteristic extraction means, the vibration amplitude and the azimuth orientation of the wave antinode of the resonance mode excited in the hemispherical resonator and the vibration amplitude of the nodal quadrature vibration excited in the hemispherical resonator.

13. The hemispherical resonator gyro according to claim 12, wherein the resonance control means comprises:

resonance amplitude control means configured to generate a resonance amplitude command to control the vibration amplitude of the resonance mode excited in the hemispherical resonator to be the constant value;

resonance phase control means configured to generate a resonance phase command to control the azimuth orientation of the wave antinode of the resonance mode excited in the hemispherical resonator to be the constant angle; and AC drive voltage distribution means configured to distribute the AC drive signal for the each of the plurality of actuators based on the resonance amplitude command, the resonance phase command, and the cosine wave signal output from the reference signal generation means.

14. The hemispherical resonator gyro according to claim 11, wherein the drive frequency correction means is configured to control the drive frequency of the actuator so that the resonance phase characteristic with respect to the AC drive signal for the actuator output from the vibration mode shape extraction means is fixed to a sum of an actuator phase characteristic at the drive frequency of the actuator, a displacement sensor phase characteristic at the drive frequency of the actuator, and −90 degrees.

15. The hemispherical resonator gyro according to claim 11, wherein the drive frequency correction means is configured to control the drive frequency of the actuator so that the resonance phase characteristic with respect to the AC drive signal for the actuator output from the vibration mode shape extraction means is fixed to an average of a resonance phase characteristic in a case in which the drive frequency of the actuator is set to be lower by a frequency set in advance with respect to the resonance frequency of the hemispherical resonator and a resonance phase characteristic in a case in which the drive frequency of the actuator is set to be higher by the frequency set in advance with respect to the resonance frequency of the hemispherical resonator.

16. The hemispherical resonator gyro according to claim 11, wherein the nodal quadrature vibration control means comprises:

electrical stiffness control means configured to generate, based on the vibration amplitude of the nodal quadrature vibration output from the vibration mode shape extraction means, an electrical stiffness correction command to suppress the nodal quadrature vibration; and DC drive voltage distribution means configured to set, depending on a sign of the electrical stiffness correction command output from the electrical stiffness control means, when the sign is a positive sign, orthogonal axis directions displaced in a phase by +22.5 degrees with respect to the azimuth orientation of the wave antinode of the resonance mode, or when the sign is a negative sign, orthogonal axis directions displaced in a phase by −22.5 degrees with respect to the azimuth orientation of the wave antinode of the resonance mode to an electrical stiffness correction axes for the hemispherical resonator, and to distribute, to each one of the actuators arranged on both sides of the electrical stiffness correction axes, the DC drive signal for the actuator based on an absolute value of the electrical stiffness correction command.

17. The hemispherical resonator gyro according to claim 13, wherein the AC drive voltage distribution means of the resonance control means is configured to distribute, to each one of the actuators arranged on both sides of orthogonal axes defined by the resonance phase command and orthogonal to the measurement axis, the AC drive signal for the actuator based on the resonance amplitude command output from the resonance amplitude control means and the cosine wave signal output from the reference signal generation means.

18. The hemispherical resonator gyro according to claim 13, wherein the AC drive voltage distribution means of the resonance control means is configured to distribute, to each two of the actuators arranged on both sides of orthogonal axes defined by the resonance phase command and orthogonal to the measurement axis, the AC drive signal for the actuator based on the resonance amplitude command output from the resonance amplitude control means and the cosine wave signal output from the reference signal generation means so that a norm of a drive voltage of the actuator is minimum.

19. The hemispherical resonator gyro according to claim 13, wherein the AC drive voltage distribution means of the resonance control means is configured to distribute, to each one of the actuators arranged on both sides of orthogonal axes defined by the resonance phase command and orthogonal to the measurement axis, a square root of a cosine wave attraction force command based on the resonance amplitude command output from the resonance amplitude control means and the cosine wave signal output from the reference signal generation means, as the AC drive signal for the actuator.

20. The hemispherical resonator gyro according to claim 13, wherein the AC drive voltage distribution means of the resonance control means is configured to calculate, to each two of the actuators arranged on both sides of orthogonal axes defined by the resonance phase command and orthogonal to the measurement axis, a cosine wave attraction force command so that a norm of a generated attraction force of the actuator is minimum based on the resonance amplitude command output from the resonance amplitude control means and the cosine wave signal output from the reference signal generation means, and to distribute a square root of the cosine wave attraction force command as the AC drive signal for the actuator.

* * * * *